United States Patent [19]

Kassai

[11] Patent Number: 4,906,017
[45] Date of Patent: Mar. 6, 1990

[54] BABY CARRIAGE

[75] Inventor: Kenzou Kassai, Osaka, Japan

[73] Assignee: Aprica Kassai Kabushikikaisha, Osaka, Japan

[21] Appl. No.: 354,483

[22] Filed: May 19, 1989

Related U.S. Application Data

[63] Continuation of Ser. No. 224,921, Jul. 27, 1988, Pat. No. 4,846,494.

[30] Foreign Application Priority Data

Jul. 28, 1987 [JP] Japan ................. 62-188276

[51] Int. Cl.$^4$ ................. A63C 7/08
[52] U.S. Cl. ................. 280/642; 280/648; 280/658; 280/47.36; 297/DIG. 4
[58] Field of Search ............... 280/643, 642, 644, 648, 280/650, 658, 47.36; 297/DIG. 4

[56] References Cited

U.S. PATENT DOCUMENTS

| 4,591,176 | 5/1986 | Kassai ................. 280/47.36 |
| 4,660,850 | 4/1987 | Nakao et al. ........... 280/47.36 |
| 4,733,882 | 3/1988 | Kassai ................. 280/642 |

FOREIGN PATENT DOCUMENTS 58-32065 7/1983 Japan .
60-105559 7/1985 Japan .
62-13230 3/1987 Japan .

Primary Examiner—David M. Mitchell
Attorney, Agent, or Firm—W. G. Fasse; D. H. Kane, Jr.

[57] ABSTRACT

A baby carriage comprises a pair of push rods, a push rod connecting member for connecting upper end portions of the pair of push rods with each other, a pair of push rod locking members for fixing positions of the push rods, a pair of opened state locking members for fixing/maintaining the baby carriage in an opened state, a pair of engagement release members provided to be displaceable between lowermost, intermediate and uppermost positions along the push rods, a wire for connecting the pair of engagement release members with each other and an operating member connected to the wire at the central portion of the push rod connecting member. When the operating member is manually brought into a second position, the engagement release members are pulled up by the wire toward the intermediate positions, to push up the opened state locking members. Consequently, the baby carriage is released from the locked opened state. When the operating member is manually brought into the third position, the engagement release members are pulled up by the wire toward the uppermost positions, to push up the push rod locking members. Consequently, the push rods are unlocked.

5 Claims, 22 Drawing Sheets

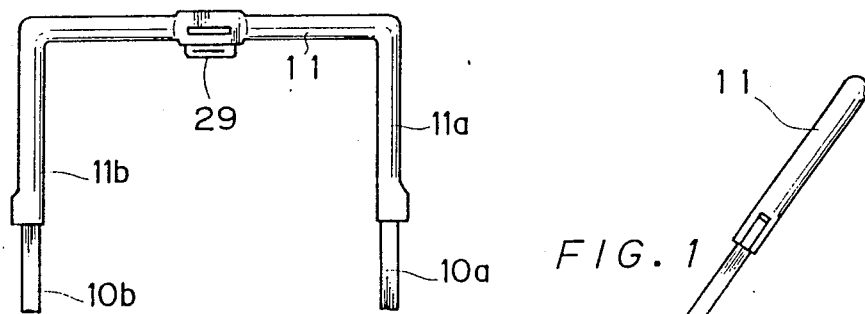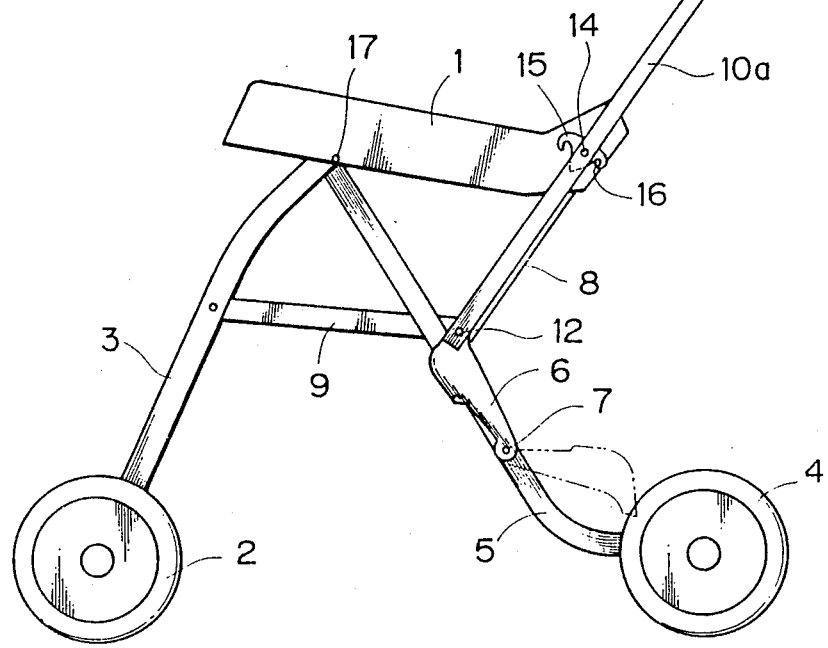

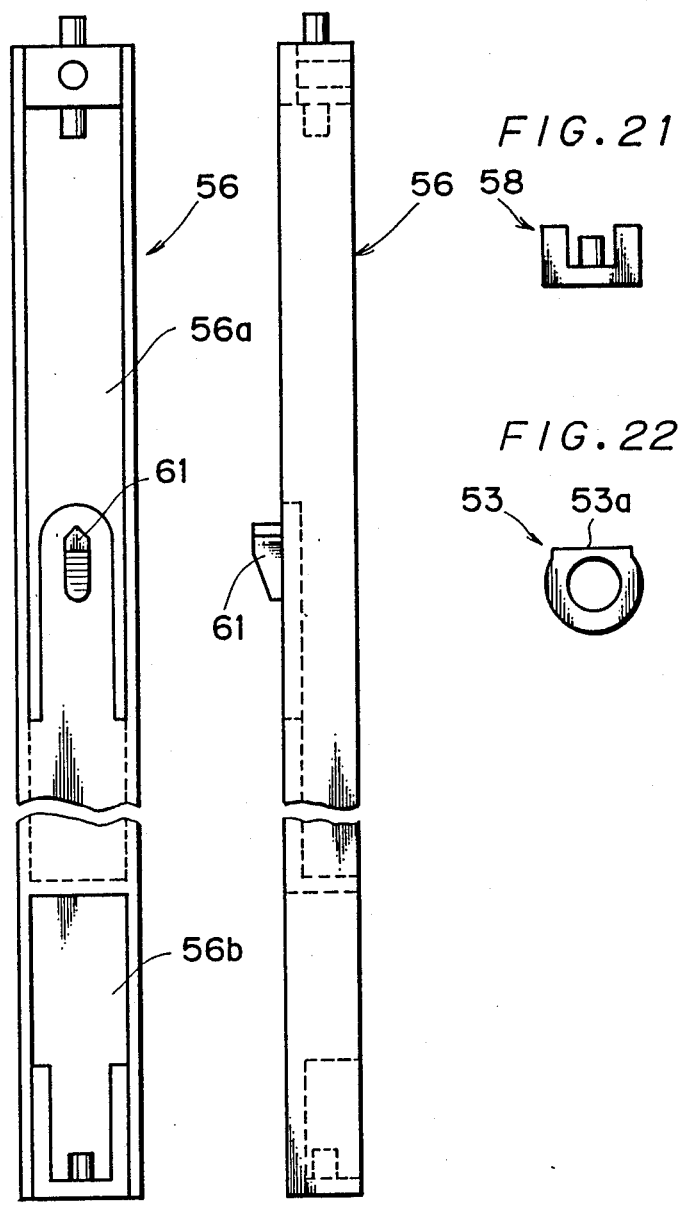

BABY CARRIAGE

This is a continuation of application Ser. No. 224,921 filed July 27, 1988, now U.S. Pat. No. 4,846,494.

BACKGROUND OF THE INVENTION

1. Field of the Invention

The present invention relates to a baby carriage, and more particularly, it relates to a baby carriage which can be released from a locked opened state and unlock rotatably provided push rods in simple operations.

2. Description of the Related Art

Japanese Patent Publication Gazette No. 32065/1983 or 13230/1987 discloses a baby carriage, which is of interest to the present invention. The baby carriage disclosed in either gazette comprises a pair of turning brackets. First ends of the pair of turning brackets are rotatably connected to central portions of a pair of rear legs respectively, to be rollable along upper or lower half portions of the rear legs. In an opened state of the baby carriage, the turning brackets are fixed in positions along the upper half portions of the rear legs, thereby to lock the baby carriage in the opened state.

Tubes engageable with the turning brackets are provided in order to fix the turning brackets. Further, a pair of operating levers are provided on a pair of push rods positioned on left and right sides of the baby carriage. The operating levers are connected with the tubes by wires. Thus, the pair of operating levers provided on the left and right push rods are so driven to move the tubes that the turning brackets are disengaged from the tubes, to be brought into rollable states. In other words, the baby carriage is released from the locked opened state.

Japanese Utility Model Laying-Open Gazette No. 105559/1985 discloses a baby carriage according to another related art example, which is also of interest to the present invention. Push rods of this baby carriage are switchable between face-to-back and face-to-face push modes. Rotatable hooks and pins engageable with the rotatable hooks are provided in order to fix the push rods in the face-to-back or face-to-face push mode. The rotatable hooks are rotatably provided on a pair of push rods positioned on left and right sides, while the engageable pins are provided in front and rear portions of the baby carriage. The pair of push rods are respectively provided with handles for rotating the rotatable hooks. In order to unlock the push rods, the pair of handles are driven by both hands thereby to rotate the rotatable hook.

Thus, in the baby carriage disclosed in Japanese Patent Publication Gazette No. 32065/1983 or 13230/1987, the pair of operating levers must be driven by both hands in order to release the baby carriage from the locked opened state. In the baby carriage disclosed in Japanese Utility Model Laying-Open Gazette No. 105559/1985, on the other hand, the pair of handles must be driven by both hands in order to unlock the push rods.

In view of operating characteristics, operating means for such releasing/unlocking is preferably at hand and capable of one-hand operation. Thus, it is necessary to unify such operating means.

SUMMARY OF THE INVENTION

Accordingly, an object of the present invention is to provide a baby carriage which can be released from a locked opened state as well as unlock push rods by single operating means.

Similarly to the baby carriage disclosed in Japanese Patent Publication Gazette No. 32065/1983 or 13230/1987, the baby carriage according to the present invention basically comprises:

(a) a pair of handrail members longitudinally extending along both side surfaces of a seat;

(b) a pair of front legs having upper end portions rotatably connected to the handrail members and lower end portions provided with front wheels;

(c) a pair of rear legs having upper end portions rotatably connected to the handrail members and lower end portions provided with rear wheels;

(d) a pair of turning brackets having first ends rotatably connected to central portions of the rear legs, to be rollable along upper or lower half portions of the rear legs;

(e) a pair of handrail support rods having upper end portions rotatably connected to second ends of the turning brackets; and (f) a pair of seat support rods longitudinally extending along both side surfaces of a cushion part of the seat and having front ends rotatably connected to the front legs and rear ends rotatably connected to the second ends of the turning brackets.

In an opened state of the baby carriage, the turning brackets are fixed in positions along the upper half portions of the rear legs, thereby to lock the baby carriage in the opened state. In a closed state of the baby carriage, on the other hand, the turning brackets are positioned along the lower half portions of the rear legs.

The baby carriage according to the present invention further comprises:

(g) a vertically extending pair of push rods having lower end portions rotatably connected to the second ends of the turning brackets, to be switchable between face-to-back and face-to-face push modes;

(h) a push rod connecting members extending along the cross direction of the baby carriage to connect upper end portions of the pair of push rods with each other;

(i) a pair of push rod locking members mounted on central portions of the push rods to be displaceable between engaged positions and non-engaged positions;

(j) engageable means provided on the body of the baby carriage to be engaged with the push rod locking members being in the engaged positions thereby to fix the push rods in the face-to-back or face-to-face push mode;

(k) a pair of opened state locking members displaceable between upper and lower positions to be engaged with the turning brackets upon movement to the lower positions in the opened state of the baby carriage thereby to fix the turning brackets in positions along the upper half portions of the rear legs;

(l) a pair of urge means for regularly urging the opened state locking members toward the lower positions;

(m) a pair of engagement release members being displaceable between lowermost, intermediate and uppermost positions along the push rods and having first acting portions for pushing up the opened state locking members toward the upper positions upon movement to the intermediate positions and second acting portions for pushing up the push rod locking members toward the non-engaged positions upon movement to the uppermost positions;

(n) a pair of return means for regularly urging the pair of engagement release members toward the lowermost positions;

(o) wire means extending along the pair of push rods and the push rod connecting member for connecting the pair of engagement release members with each other; and (p) operating means being displaceable between first, second and third positions and connected to the wire means at the central portion of the push rod connecting member.

When the pair of engagement release members are brought into the lowermost positions, the operating means is in the first position. When the operating means is manually brought into the second position, the pair of engagement release members are pulled up by the wire means toward the intermediate positions. When the operating means is manually brought into the third position, the pair of engagement release members are pulled up by the wire means toward the uppermost positions.

In an opened state of the baby carriage, the pair of engagement release members are urged by the pair of return means toward the lowermost positions, while the pair of opened state locking members are urged by the pair of urge means toward the lower positions. In this state, the pair of opened state locking members are engaged with the pair of turning brackets, to fix the turning brackets in the positions along the upper half portions of the rear legs. Consequently, the baby carriage is locked in the opened state. In this state, further, the pair of push rod locking members are in the engaged positions to be engaged with the engageable means provided on the body of the baby carriage, thereby to fix the push rods in the face-to-back or face-to-face push mode. The operating means is in the first position.

Then, when the operating means is manually brought into the second position, the pair of engagement release members are pulled up by the wire means toward the intermediate positions. Then, the first acting portions of the engagement release members push up the opened state locking members toward the upper positions. Consequently, the opened state locking members are disengaged from the turning brackets, whereby the turning brackets can be rolled. In other words, the baby carriage is released from the locked opened state when the operating means is brought into the second position.

When the operating means is manually brought into the third position, the pair of engagement release members are pulled up by the wire means toward the uppermost positions. Then, the second acting portions of the engagement release members upwardly press the push rod locking members toward the non-engaged positions. Namely, the push rod locking members are disengaged from the engageable means, to be rotatable.

In summary, the operating means positioned in the central portion of the push rod connecting member is manually brought into the second position, to release the baby carriage from the locked opened state. The operating means is brought into the third position, to unlock the push rods.

According to the present invention, the baby carriage can be released from the locked opened state and the push rods can be unlocked by driving the single operating means provided in the central portion of the push rod connecting member. Such operation can be performed by one hand with single operating means, whereby the operation is extremely simplified.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a left-side elevational view showing a baby carriage according to an embodiment of the present invention;

FIG. 2 is a front elevational view showing connection between push rods 10a and 10b and a push rod connecting member 11 of the baby carriage shown in FIG. 1;

FIG. 4 is a sectional view showing a part of a leg portion 11a of the push rod connecting member 11 overlapping with the push rod 10a;

FIGS. 14 and 15 are sectional views similar to FIG. 8, while FIG. 14 shows such a state that an operating button 29 is brought into a second position; and FIG. 15 shows such a state that the operating button 29 is brought into a third position;

FIG. 19 is a front elevational view of an engagement release member 56 shown in FIG. 16, and FIG. 20 is a side elevational view thereof;

FIG. 21 is a front elevational view of a spring support member 58 shown in FIG. 16;

FIG. 22 is a front elevational view of a cam member 53 shown in FIG. 16;

DESCRIPTION OF THE PREFERRED EMBODIMENTS

Figure 3:
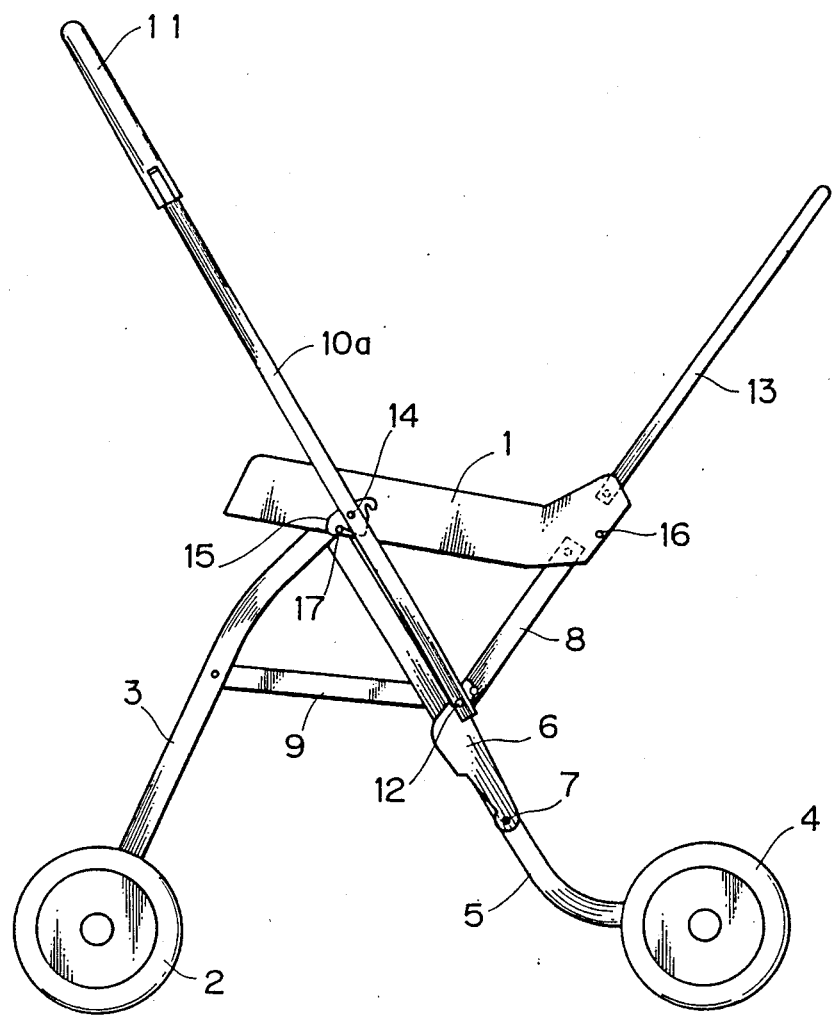
FIG. 3 is a side elevational view showing such a state that the push rods are switched to a face-to-face push mode from the state shown in FIG. 1.

FIGS. 1 and 3 are side elevational views showing the left side of a baby carriage according to an embodiment of the present invention. FIG. 1 illustrates such a state that push rods are fixed in a face-to-back push mode, and FIG. 3 illustrates such a state that the push rods are fixed in a face-to-face push mode. The right side of the baby carriage is symmetrical to that shown in FIGS. 1 and 3.

The baby carriage basically comprises a pair of handrail members 1 longitudinally extending along both side surfaces of a seat, a pair of front legs 3 having upper end portions rotatably connected to the handrail members 1 and lower end portions provided with front wheels 2, a pair of rear legs 5 having upper end portions rotatably connected to the handrail members 1 and lower end portions provided with rear wheels 4, a pair of turning brackets 6 having first ends rotatably connected to central portions of the rear legs 5 through shafts 7 to be rollable along upper or lower half portions of the rear legs 5, a pair of handrail support rods 8 having upper end portions rotatably connected to rear ends of the handrail members 1 and lower end portions rotatably connected to second ends of the turning brackets 6, and a pair of seat support rods 9 longitudinally extending along both side surfaces of a cushion part of the seat and having front ends rotatably connected to the front legs 3 and rear ends rotatably connected to second ends of the turning brackets 6. The turning brackets 6, the handrail support rods 8 and the seat support rods 9 are connected to each other by shafts 12.

In an opened state of the baby carriage, the turning brackets 6 are fixed in positions along upper half portions of the rear legs 5, thereby to lock the baby carriage in the opened state. The baby carriage can be released from the locked opened state by unlocking the turning brackets 6, being in the fixed positions. Thus, the baby carriage can be folded. With an operation for folding the baby carriage, the turning brackets 6 are rotated clockwisely in FIG. 1, to be positioned along the lower half portions of the rear legs 5 as shown by phantom lines in FIG. 1 in a closed state of the baby carriage. Such folding operation is similar to that of a baby carriage disclosed in Japanese Patent Publication Gazette No. 32065/1983 or 13230/1987. In such a folded state of the baby carriage, the front wheels 2 and the rear wheels 4 mutually approach to be flush with each other, thereby enabling a self standing of the baby carriage.

Referring to FIG. 3, the baby carriage further comprises a pair of backrest members 13 having lower end portions rotatably connected to rear portions of the handrail members 1, a vertically extending pair of push rods 10a and 10b having lower end portions rotatably connected to the second ends of the turning brackets 6 through the shafts 12, to be switchable between a face-to-back push mode and a face-to-face push mode and a push rod connecting member 11 extending along the cross direction of the baby carriage to connect upper end portions of the pair of push rods 10a and 10b with each other.

The bracket members 13 are fixed in positions of a desired angle of inclination by appropriate reclining adjuster means (not shown).

A pair of rotatable hooks 15 are rotatably mounted on central portions of the vertically extending pair of push rods 10a and 10b through shafts 14. Engageable pins 16 and 17 are correspondingly provided on rear and front portions of the handrail members 1. In the state as shown in FIG. 1, the rotatable hooks 15 are engaged with the rear engageable pins 16, thereby to fix the pair of push rods 10a and 10b in the face-to-back push mode. In the state as shown in FIG. 3, on the other hand, the rotatable hooks 15 are engaged with the front engageable pins 17, thereby to fix the pair of push rods 10a and 10b in the face-to-face push mode.

Figure 12:
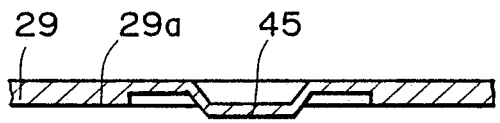
FIG. 12 is a partially fragmented sectional view taken along the line 8—8 in FIG. 7.

FIG. 12 is a front elevational view showing a connection between the pair of push rods 10a and 10b and the push rod connecting member 11. The push rod connecting member 12 has leg portions 11a and 11b which overlap with upper portions of the pair of push rods 10a and 10b. The push rod connecting member 11 is vertically movable with respect to the pair of push rods 10a and 10b.

Figure 4:
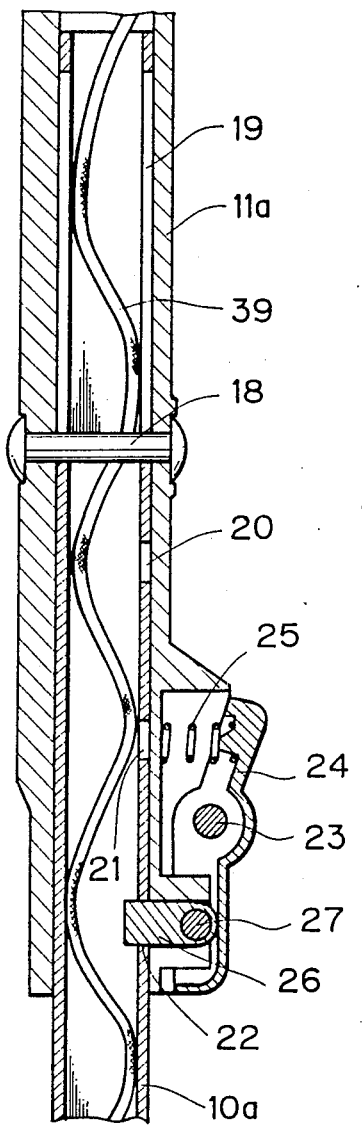

FIG. 4 is a sectional view showing an overlapping portion of one leg 11a of the push rod connecting member 11 and the push rod 10a in detail. As shown in FIG. 4, the upper portion of the push rod 10a is inserted into the leg portion 11a of the push rod connecting member 11. The push rod 10a is provided with a vertically elongated hole 19 while the leg portion 11a is fixedly provided with a shaft 18 to be inserted into the elongated hole 19. The push rod connecting member 11 is vertically movable within the range movement of the shaft 18 in the elongated hole 19.

Figure 5:
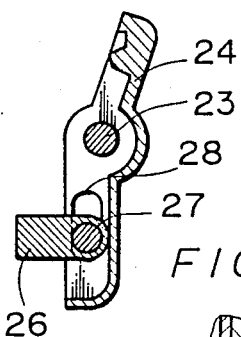
FIG. 5 is a sectional view independently showing an operating lever 24 appearing in FIG. 4.

In order to fix the push rod connecting member 11 in an appropriate vertical position, the push rod 10a is provided with a plurality of vertically aligned engaging holes 20, 21 and 22. Correspondingly, an operating lever 24 is rotatably mounted on the leg portion 11a through a shaft 23. FIG. 5 independently shows the operating lever 24, which is provided with a fitting member 26 and an elongated hole 28. The fitting member 26 includes a shaft 27, which is positioned in the elongated hole 28.

Figure 6:
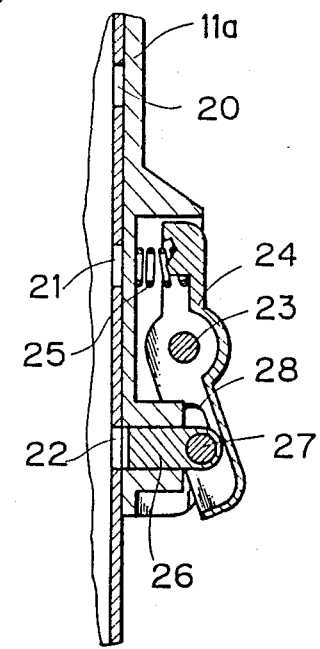
FIG. 6 is a sectional view showing a state of the operating lever 24 being rotated from the state shown in FIG. 4.

In the sate as shown in FIG. 4, the fitting member 26 of the operating lever 24 is engaged into the engaging hole 22 of the push rod 10a, thereby to inhibit movement of the push rod connecting member 11. Such a state of engagement is strictly maintained by a spring 25. In order to change the vertical position of the push rod connecting member 11, the operating lever 24 is rotated counterclockwise in FIG. 1 against force of the spring 25. FIG. 6 shows such a state that the fitting member 26 of the operating lever 24 is disengaged from the engaging hole 22. Thus, the push rod connecting member 11 can be upwardly moved. When the push rod connecting member 11 is brought into a desired vertical position, the operating lever 24 is unhanded to be rotated clockwisely in the figure by an urging force of the spring 25, so that the fitting member 26 is engaged into any one of the engaging holes 20, 21 and 22 to fix the push rod connecting member 11 in the desired vertical position.

Figure 7:
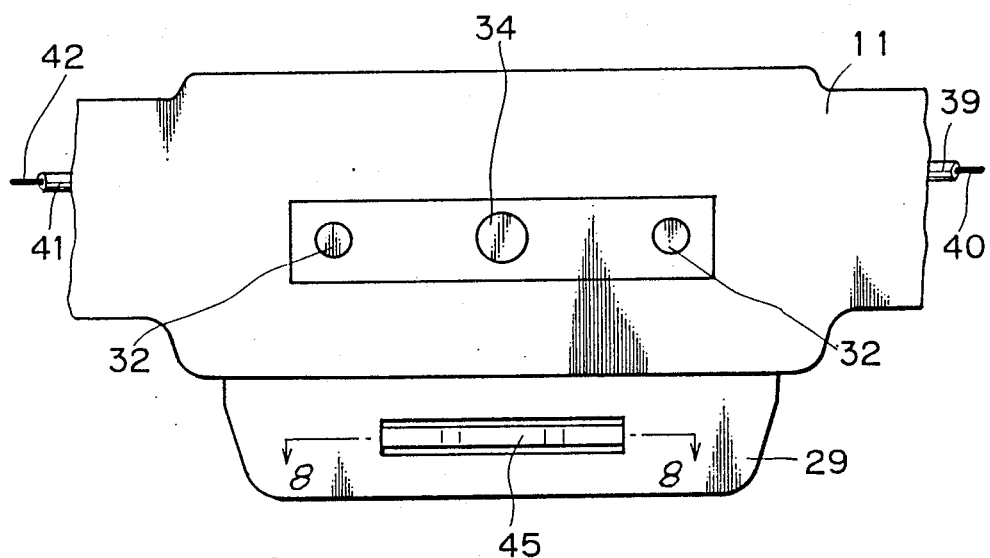
FIG. 7 is a front elevational view showing a central portion of the push rod connecting member 11.
Figure 8:
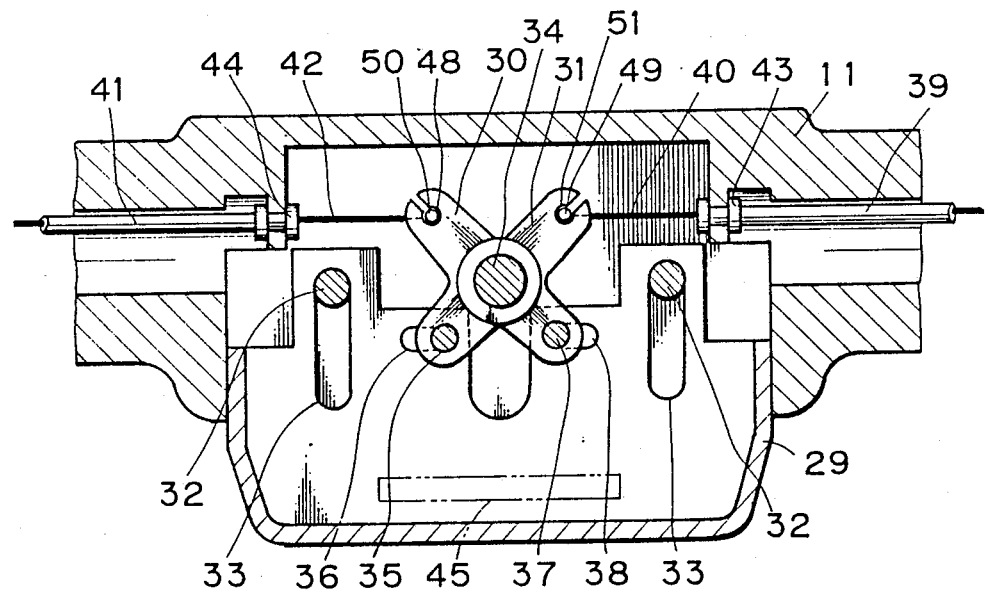
FIG. 8 is a sectional view of the portion shown in FIG. 7.

FIG. 7 is a front elevational view showing a central portion of the push rod connecting member 11 and FIG. 8 is a sectional view thereof. The push rod connecting member 11 is provided in its central portion with operating means for releasing the baby carriage from the locked opened state as well as unlocking the push rods 10a and 10b. Such operating means will now be described below.

The operating means includes an operating button 29 which is vertically movably integrated into the central portion of the push rod connecting member 11 and a pair of rotatable members 30 and 31 having central portions rotatably mounted on the central portion of the push rod connecting member 1 through a shaft 34 and first ends connected to the operating button 29 through pins and elongated holes which are combined with each other.

As clearly shown in FIG. 8, the operating button 29 is provided with vertically elongated holes 33. Shafts 32 are fixedly provided in the central portion of the push rod connecting member 11 to be inserted into the elongated holes 33. The operating button 29 is vertically movable with respect to the push rod connecting member 11 within the range of relative vertical movement of the shafts 32 in the elongated holes 33.

Figure 10:
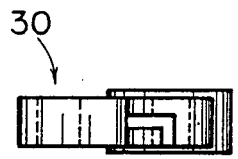
FIG. 10 is a plan view thereof.
Figure 9:
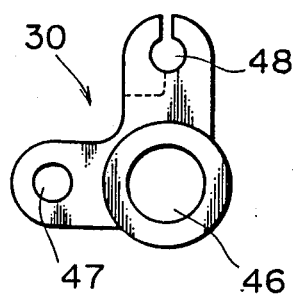
FIG. 9 is a front elevational view of a rotatable member 30 shown in FIG. 8.
Figure 11:
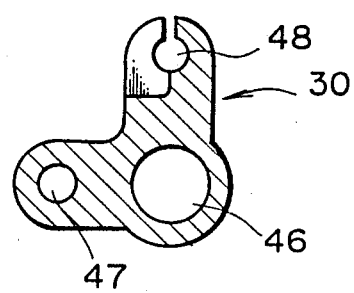
FIG. 11 is a front section view thereof.

FIGS. 9 to 11 independently show the rotatable member 30. The pair of rotatable members 30 and 31 are provided with pins 35 and 37 on first ends thereof. These pins 35 and 37 are respectively received in elongated holes 36 and 38 provided in the operating button 29. The holes 36 and 38 are elongated along the longitudinal direction of the push rod connecting member 11. Thus, the pair of rotatable members 30 and 31 are rotated oppositely to each other, following vertical movement of the operating button 29. When the operating button 29 is upwardly moved from the state shown in FIG. 8, for example, the rotatable member 30 is clockwise rotated about the shaft 34 and the other rotatable member 31 is counterclockwise rotated about the shaft 34. A center hole 46 shown in FIGS. 9 and 11 is adapted to receive the shaft 34 shown in FIG. 8, and a hole 47 shown in FIGS. 9 and 11 is adapted to receive the pine 35 shown in FIG. 8.

Flexible tubes 39 and 41 forming a pair are mounted in the push rod connecting member 11 as shown in FIG. 8. The push rods 10a and 10b are in loosened states, when the elements are in positions partially shown in FIG. 8. A part of the flexible tube 39 is also shown in FIG. 4. The flexible tube 39 has an upper end portion fixed to the push rod connecting member 11 through a mounting member 43 and a lower end portion fixed to the push rod 10a. The other flexible tube 41 has an upper end portion fixed to the push rod connecting member 11 through another mounting member 44 and a lower end portion fixed to the other push rod 10b.

A wire 40 is slidably inserted into the flexible tube 39 in a closed state. An end pin 49 is mounted on the forward end of the wire 40, to be fitted into a hole 51 provided on the other end of the rotatable member 31. The other end (not shown in FIG. 8) of the wire 40 is connected to an engagement release member contained in a lower portion of the push rod 10a. The structure concerning the engagement release member is hereinafter described.

In a similar manner, another wire 42 is slidably inserted into the other flexible tube 41 in a closed state. An end pin 50 is mounted on the forward end of the wire 42, to be fitted into a hole 48 provided in the other end of the rotatable member 30. The other end of the wire 42 is also connected to an engagement release member contained in the lower portion of the push rod 10b. Both of the other ends of the wires 40 and 42 are downwardly pulled by springs. In other words, the rotatable member 31 is regularly urged into clockwise rotation in FIG. 8 and the other rotatable member 30 is regularly urged into counterclockwise rotation. Therefore, the operating button 29 is downwardly pushed by the rotatable members 30 and 31 in a non-operating state, to be brought into a lowermost position, i.e., a first position.

Figure 13:
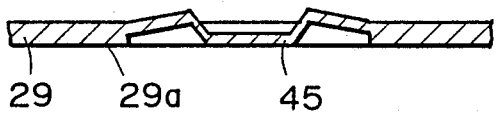
FIG. 13 is a sectional view showing such a state that a top portion of a thin wall band 45 is manually pushed from the state shown in FIG. 12.

The operating button 29 can be brought into second and third positions, in addition to the aforementioned first position. In order to implement such switching, a thin wall band 45 is provided on the operating button 29, as shown in FIG. 7. FIG. 12 is a partially fragmented sectional view taken along the line 8—8 in FIG. 7. The thin wall band 45 is provided in a frontwardly projecting angular configuration, so that its top portion extends beyond a surface 29a of the operating button 29. When the thin wall band 45, being elastic due to its small thickness, is manually pushed from the front side, the top portion of the thin wall band 45 is inwardly moved to be flush with the surface 29a of the operating button 29 as shown in FIG. 13.

Figure 14:
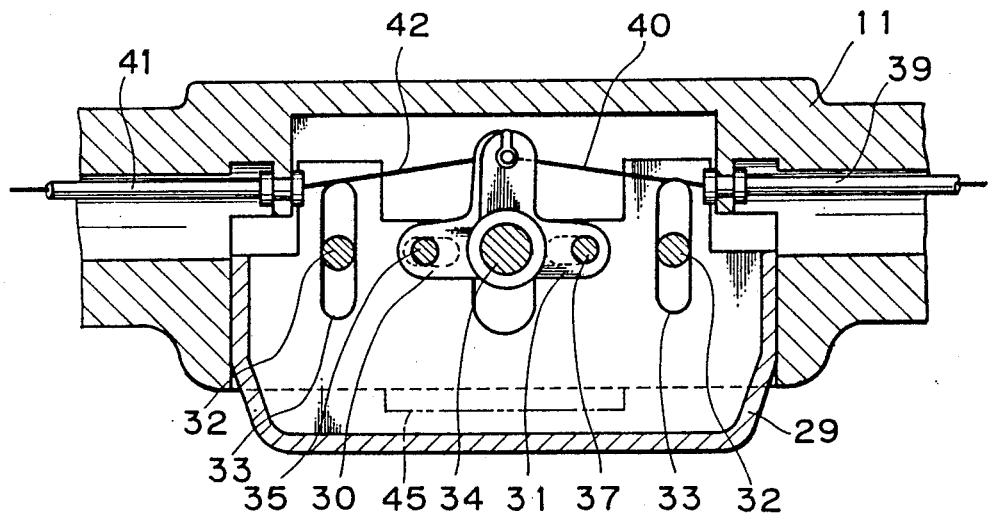

When the operating button 29 is manually upwardly moved from the state shown in FIG. 8, the thin wall band 45 is first brought into contact with the bottom surface of the push rod connecting member 11, thereby to inhibit further upward movement of the operating button 29. FIG. 14 shows such a state that the operating button 29 is brought into the second position. Following such upward movement of the operating button 29, the rotatable member 31 is rotated anticlockwisely in the figure, thereby to pull up the wire 40 along the push rod 10a. Similarly, the other rotatable member 30 is rotated clockwisely in the figure, thereby to pull up the wire 42 along the push rod 10b.

Figure 15:
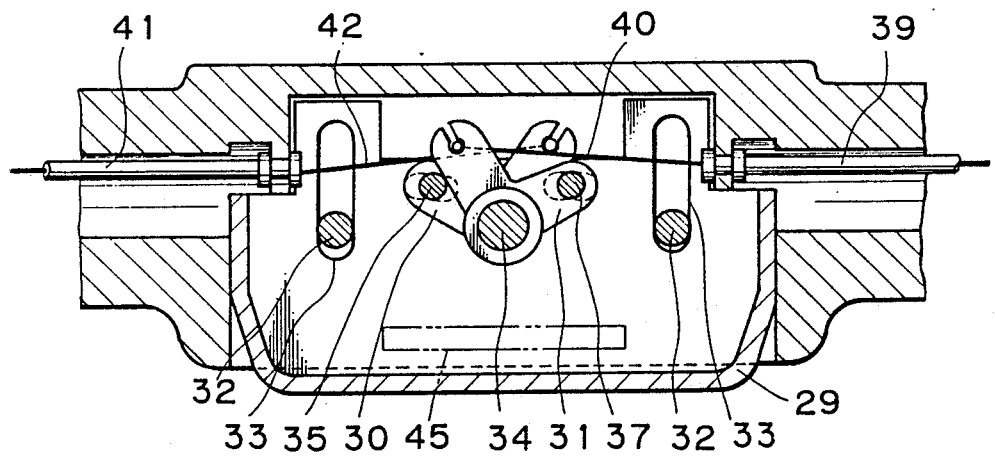

When the thin wall band 45 is pressed by a finger to be internally moved in the state shown in FIG. 14, further upward movement of the operating button 29 is enabled. FIG. 15 shows such a state that the operating button 29 is further upwardly moved from the state shown in FIG. 14. Referring to FIG. 15, the operating button 29 is brought into the third position. In this state, both of the wires 40 and 42 are further pulled up along the push rods 10a and 10b.

As shown in FIG. 4, the flexible tubes 39 and 41 receiving the wires 40 and 42 are contained in the push rod connecting member 11 and the push rods 10a and 10b in loosened states. The flexible tubes 39 and 41 are provided in such loosened states since the vertical position of the push rod connecting member 11 is changeable. The loosened states of the flexible tubes 39 and 41 are changed upon change in vertical position of the push rod connecting member 11, while the flexible tubes 39 and 41 themselves are constant in length. Thus, no influence is exerted on tension for the wires 40 and 42 even if the vertical position of the push rod connecting member 11 is changed.

Figure 16:
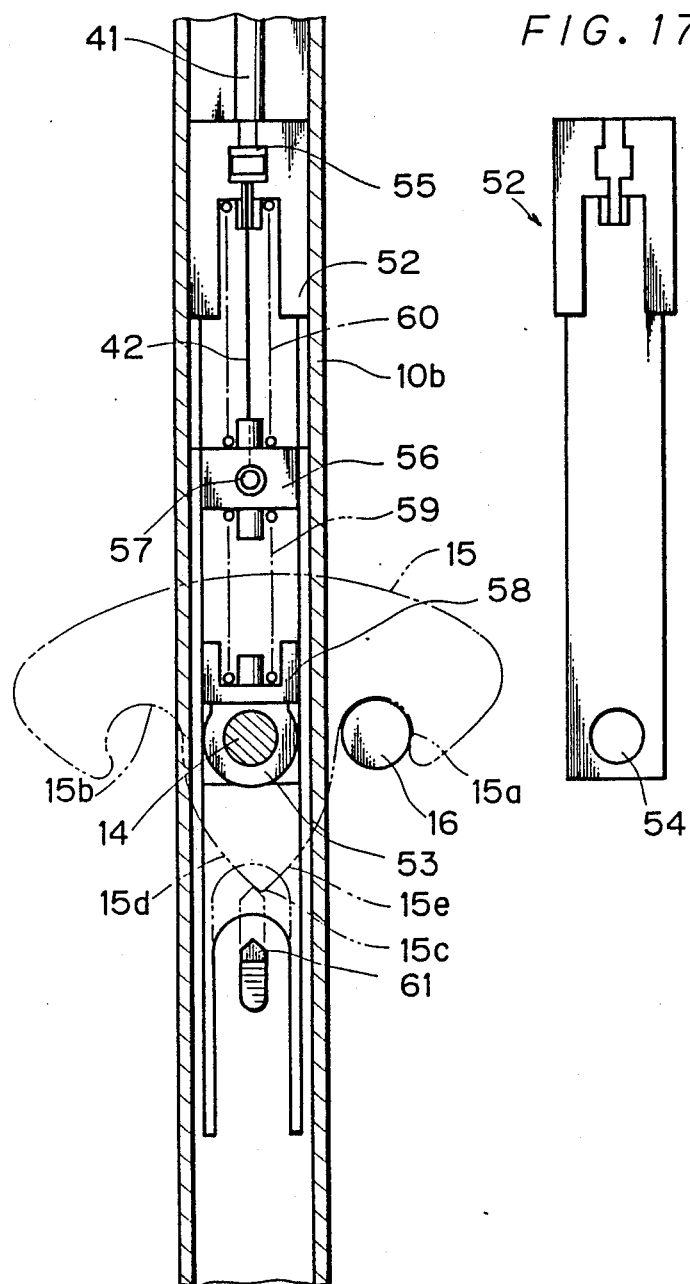
FIG. 16 is a sectional view showing a central portion of the push rod 10b.

FIG. 16 illustrates the central portion of the push rod 10b positioned on the right side of the baby carriage as viewed from the inner side of the baby carriage. The shaft 14 passes through the center of the push rod 10b, so that the rotatable hook 15, a cam member 53 and a fixing member 52 are mounted through the shaft 14. The rotatable hook 15 is positioned on the side surface of the push rod 10b directed to the interior of the baby carriage, while the cam member 53 and the fixing member 52 are contained in the push rod 10b. The rotatable hook 15 and the cam member 53 are integrally rotated with the shaft 14.

Figure 17:
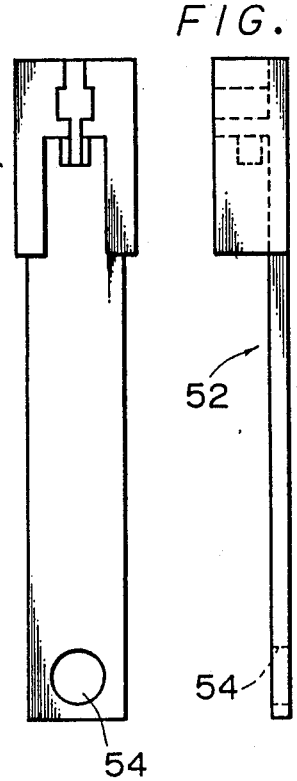
FIG. 17 is a front elevational view of a fixing member 52 shown in FIG. 16.
Figure 18:
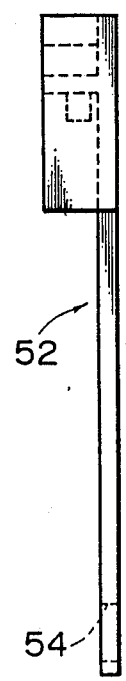
FIG. 18 is a side elevational view thereof.

FIGS. 17 and 18 show the fixing member 52, which is provided on its lower portion with a hole 54 passing through the same. The shaft 14 is inserted into the hole 54.

Referring to FIG. 16, the lower end of the flexible tube 41 extending from the center of the push rod connecting member 11 is fixedly mounted on an upper portion of the fixing member 52 through the mounting member 55. An engagement release member 56 is vertically movably contained in the push rod 10b. As shown in FIGS. 19 and 20, the engagement release member 56 has a space part 56a. The shaft 14 passing through the push rod 10b is positioned in the space part 56a of the engagement release member 56.

As shown in FIG. 16, the lower end of the wire 42 inserted into the flexible tube 41 is connected to an upper portion of the engagement release member 56 through a pin 57. A spring 60 is provided between the engagement release member 56 and the fixing member 52, thereby to regularly downwardly urge the engagement release member 56. In other words, the wire 42 is regularly subjected to downward tension.

A spring support member 58 is placed on the cam member 53, which is integrally rotated with the shaft 14 and the rotatable hook 15. FIG. 21 independently shows the spring support member 58, and FIG. 22 independently shows the cam member 53. The cam member 53 has a flat portion 53a, which is in contact with the bottom surface of the spring support member 58. As shown in FIG. 16, a spring 59 is provided between the spring support member 58 and the engagement release member 56. The spring support member 58 is regularly downwardly urged by the spring 59. Spring force of the spring 59 is smaller than that of another spring 60 provided between the engagement release member 56 and the fixing member 52.

Figures 23, 24:
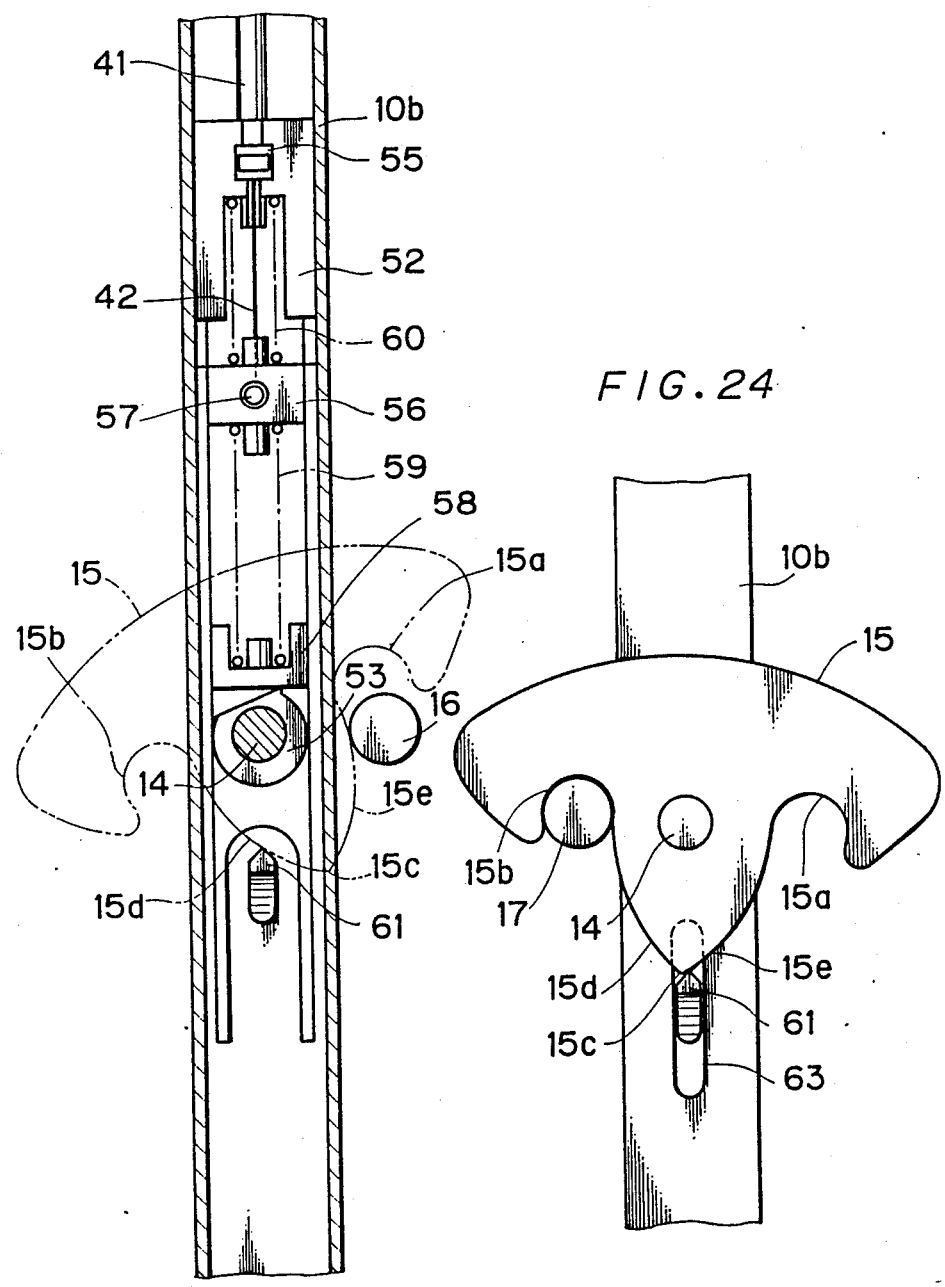
FIG. 23, being similar to FIG. 16, shows such a state that the rotatable hook 15 is brought into a non-engaged position.
FIG. 24 illustrates a portion on which the rotatable hook 15 is mounted as viewed from the inner side of the baby carriage.

When the cam member 53 is integrally rotated with the shaft 14 and the rotatable hook 15 as shown in FIG. 23 from the state of FIG. 16, the spring support member 58 is upwardly moved an urging force of the spring 59.

In the state shown in FIG. 23, the spring support member 58 and the cam member 53, being in an unstable relation to each other, are regularly urged by the spring 59 to return to the stable relationship as shown in FIG. 16.

FIG. 24 illustrates the rotatable hook 15 mounted on the side surface of the push rod 10b which is directed to the interior of the baby carriage. This rotatable hook 15 has engageable recesses 15a and 15b, which are engageable with the engageable pins 16 and 17 provided on the rear and front portions of the handrail members 1. The lower portion of the rotatable hook 15 is tapered in the form of V toward a bottom end portion 15c. When the engageable recess 15a of the rotatable hook 15 is engaged with the engageable pin 16 provided in the rear portion of the handrail member 1 as shown in FIG. 16, the pair of push rods 10a and 10b are fixed in the face-to-back push mode. When, on the other hand, the other engageable recess 15b is engaged with the engageable pin 17 provided on the front portion of the handrail member 1, the pair of push rods 10a and 10b are fixed in the face-to-face push mode.

Referring to FIGS. 19 and 20, the engagement release member 56 is provided with a sidewardly projecting second acting portion 61. The second acting portion 61 passes through the wall of the push rod 10b, to project on the side surface of the push rod 10b which is directed toward the interior of the baby carriage. Referring to FIG. 24, the push rod 10b is provided with a vertically elongated hole 63 for receiving the second acting portion 61. The second acting portion 61 is vertically moved within the elongated hole 63 following vertical movement of the engagement release member 56.

The configuration of the rotatable hook 15, positional relation between the rotatable hook 15 and the engageable pins 16 and 17 and the like are selected to achieve the operation as hereinafter described.

When the operating button 29 is in the first position as shown in FIG. 8, the rotatable hook 15 and the engagement release member 56 are in the state shown in FIG. 16. Namely, the rotatable hook 15 is engaged with the engageable pin 16 or 17 provided on the handrail member 1, to fix the pair of push rods 10a and 10b in the face-to-back or face-to-face push mode.

When the operating button 29 is manually moved to the second position as shown in FIG. 14, the engagement release member 56 is pulled by the wire 42 to be upwardly moved. Following such upward movement of the engagement release member 56, the second acting portion 61 is also upwardly moved as shown by the phantom line in FIG. 16. The second acting portion 61 is thus upwardly moved when the operating button 29 is switched to the second position as shown in the figure, while the same is not yet brought into a position for upwardly pressing the rotatable hook 15.

When the operating button 29 is switched to the third position as shown in FIG. 15, the engagement release member 56 as well as the second acting portion 61 are further upwardly moved, as shown in FIG. 23. When the operating button 9 is thus brought into the third position, the second acting portion 61 upwardly presses an inclined surface 15d of the rotatable hook 15 as shown in FIG. 23, thereby to rotate the rotatable hook 15 counterclockwise in the figure. Consequently, the engageable recess 15a of the rotatable hook 15 is disengaged from the engageable pin 16 to enable rotation of the pair of push rods 10a and 10b.

FIG. 24 corresponds to such a state that the pair of push rods 10a and 10b are fixed in the face-to-face push mode and the operating button 29 is brought into the second position. When the operating button 29 is moved to the third position from the state shown in FIG. 24, the second acting portion 61 upwardly presses an inclined surface 15e of the rotatable hook 15, thereby to rotate the rotatable hook 15 clockwisely in the figure. Consequently, the engageable recess 15b of the rotatable hook 15 is disengaged from the engageable pin 17 to enable rotation of the pair of push rods 10a and 10b.

Figure 25:
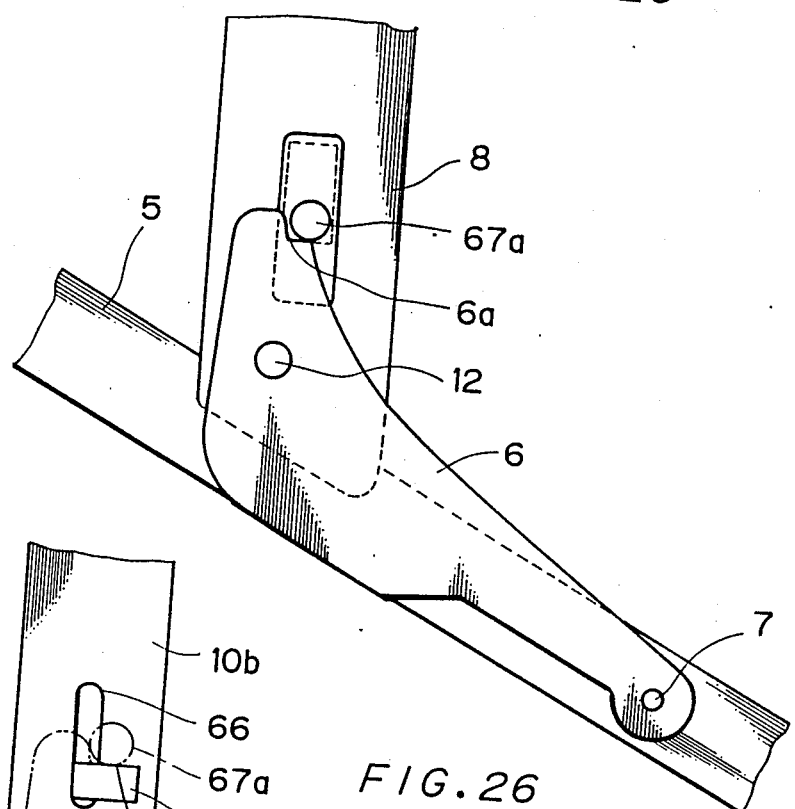
FIG. 25 illustrates a connection between a handrail support rod 8 and a turning bracket 6 as viewed from the inner side of the baby carriage.
Figure 26:
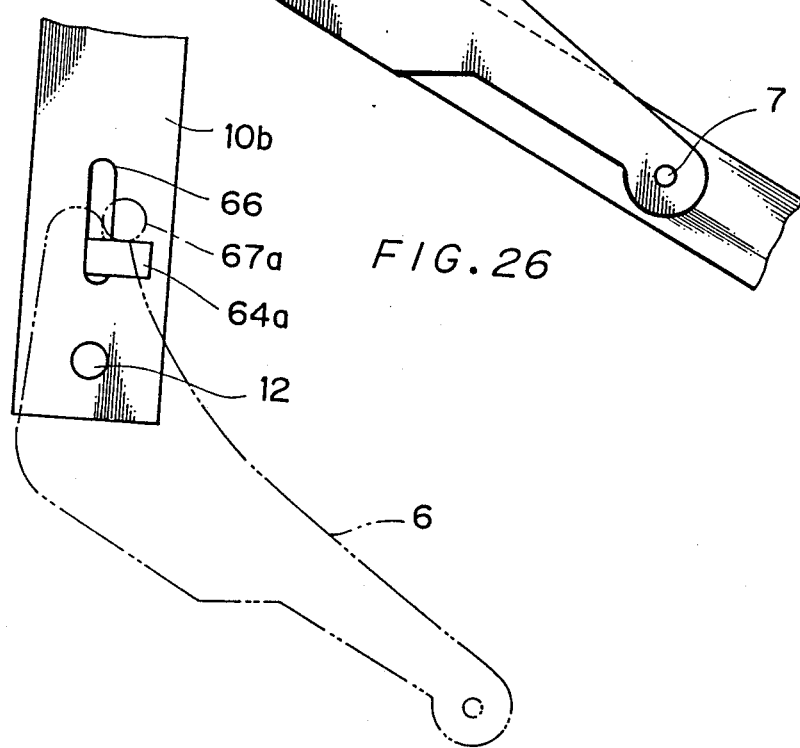
FIG. 26 illustrates a connection between the push rod 10b and the turning bracket 6 as viewed from the inner side of the baby carriage.
Figure 27:
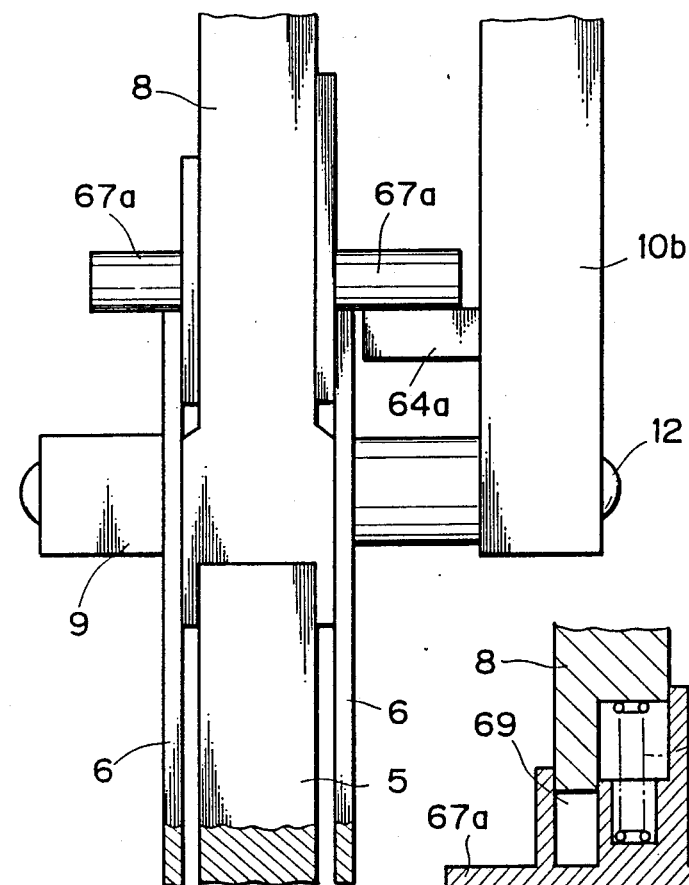
FIG. 27 illustrates a connection between the push rod 10b positioned on the right side of the baby carriage, the handrail support rod 8 and a seat support rod 9 as viewed from the rear side of the baby carriage.
Figure 28:
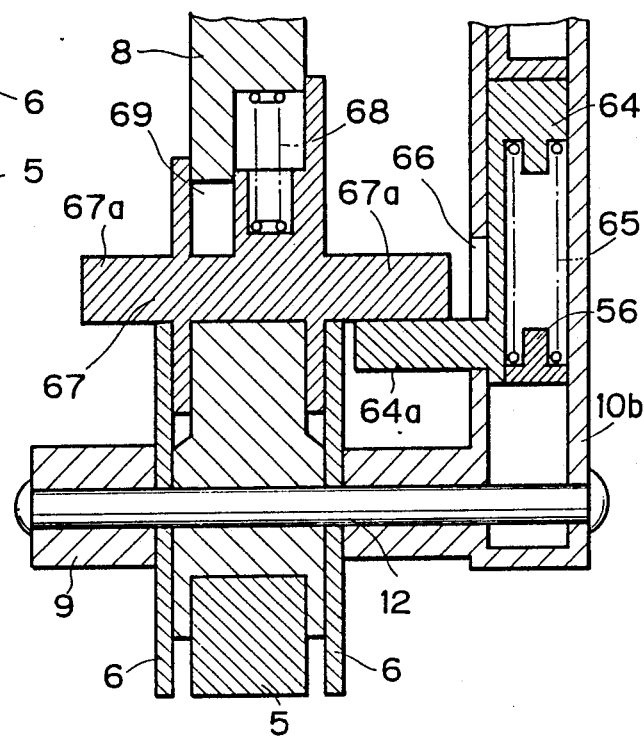
FIG. 28 is a sectional view of the portion shown in FIG. 27.

FIG. 25 illustrates a connection between the turning bracket 6 positioned on the right side of the baby carriage and the handrail support rod 8 as viewed from the inner side of the baby carriage. FIG. 26 illustrates a connection between the push rod 10b positioned on the right side of the baby carriage and the turning bracket 6 as viewed from the inner side of the baby carriage. FIG. 27 illustrates a portion concerning the turning bracket 6 positioned on the right side of the baby carriage as viewed from the right side of the baby carriage as viewed from the rear side of the baby carriage, and FIG. 28 is a sectional view thereof. In FIGS. 25 and 26, the seat support rod 9 is omitted for the convenience of illustration.

Referring to these figures, the turning bracket 6 is so arranged to hold the rear leg 5 that its first end is rotatably connected to the rear leg 8 through the shaft 7. A rear end of the seat support rod 9 and lower ends of the handrail support rod 8 and the push rod 10b are rotatably connected to a second end of the turning bracket 6 through the shaft 12 respectively. As shown in FIG. 27, the push rod 10b is externally positioned and the seat support rod 9 is internally positioned with respect to the handrail support rod 8, the rear leg 5 and the turning bracket 6. In the opened state of the baby carriage, the turning bracket 6 is fixed in a position along the upper half portion of the rear leg 5, thereby to lock the baby carriage in the opened state. In the closed state of the baby carriage, on the other hand, the turning bracket 6 is positioned along the lower half portion of the rear leg 5.

Figure 30:
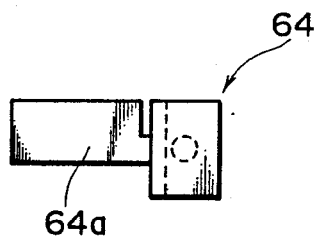
FIG. 30 is a plan view thereof.
Figure 29:
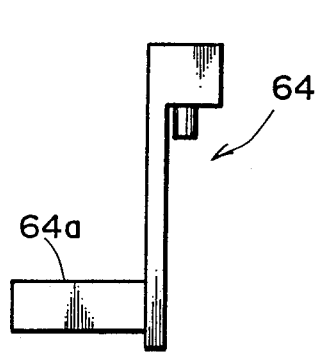
FIG. 29 is a front elevational view of a first acting portion 64 shown in FIG. 28.

The engagement release number 56 to be pulled up by the wire 42 has a lower space 56b in its lower part, as shown in FIG. 19. This lower space 56b contains a first acting portion 64, which is an element of the engagement release member 56, as shown in FIG. 28. The entire configuration of the first acting portion 64 will be obvious from FIGS. 29 and 30. The first acting portion 64 has a push-up portion 64a projecting toward the inner side of the baby carriage. This push-up portion 64a protrudes through the wall of the push rod 10b. As shown in FIG. 26, the push rod 10b is correspondingly provided with an elongated hole 66 for guiding the push-up portion 64a. As clearly shown in FIG. 28, further, a spring 65 is provided between a lower end of the engagement release member 56 and the first acting portion 64 to urge these elements in opposite directions.

Figure 32:
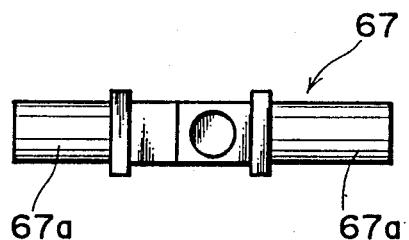
FIG. 32 is a plan view thereof.
Figure 31:
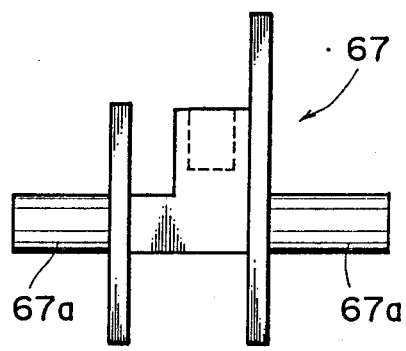
FIG. 31 is a front elevational view of an opened state locking member 67 shown in FIG. 28.

As shown in FIG. 28, a vertically elongated guide hole 69 is also provided in the lower end of the handrail support rod 8. An opened state locking member 67 is vertically movably received in the guide hole 69. FIGS. 31 and 32 independently show the opened state locking member 67. As shown in these figures, the opened state locking member 67 has engageable shaft portions 67a projecting toward inner and outer side portions. As shown in FIG. 28, a spring 68 is provided between the opened state locking member 67 and the handrail support rod 8, thereby to regularly downwardly urge the opened state locking member 67. Spring force of the spring 68 is smaller than that of the spring 65 provided between the engagement release member 56 and the first acting portion 64.

Referring to FIGS. 25 and 26, the turning bracket 6 is provided with an engageable recess 6a which is adapted to receive the engageable shaft portion 67a of the opened state locking member 67. In the opened state of the baby carriage, the engageable shaft portion 67a of the opened state locking member 67 is engaged with the engageable recess 6a of the turning bracket 6, thereby to inhibit rotation of the turning bracket 6 for locking the baby carriage in the opened state.

Figure 33:
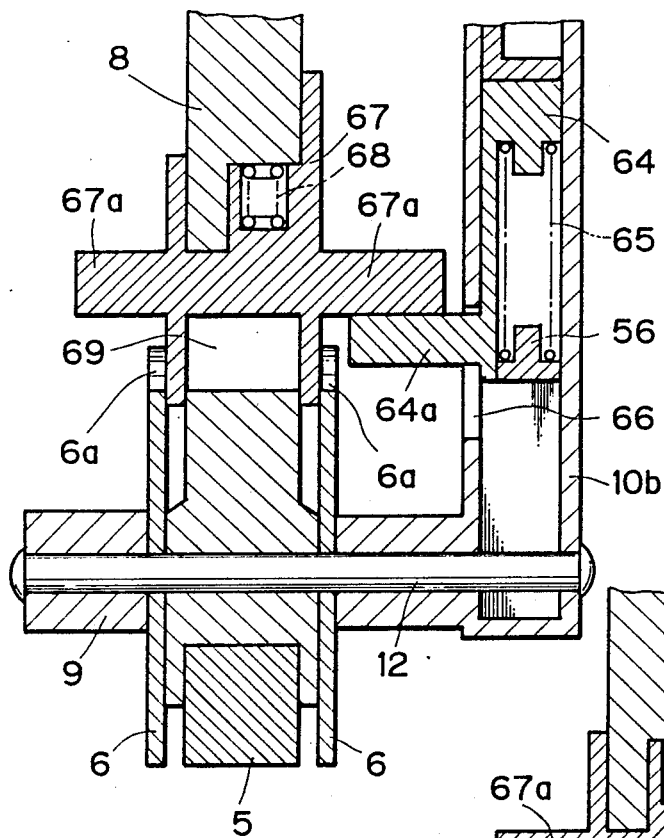
FIG. 33 is a sectional view showing such a state that the engagement release member 56 is moved to an intermediate position from the state shown in FIG. 28.
Figure 34:
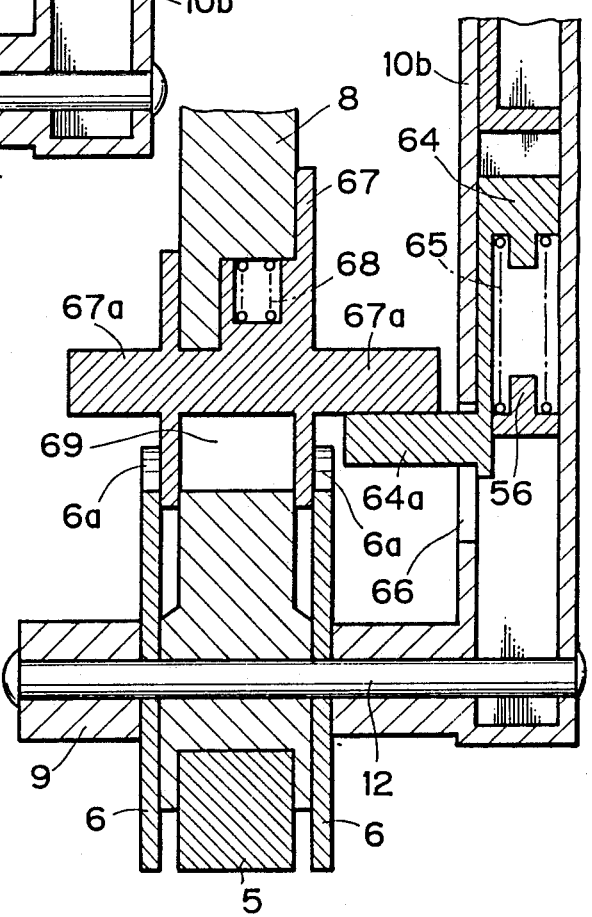
FIG. 34 is a sectional view showing such a state that the engagement release member 56 is moved to an uppermost position from the state shown in FIG. 33.

Referring to FIGS. 26, 27 and 28, the engageable shaft portion 67a is brought into contact with the push-up portion 64a of the first acting portion 64 when the engageable shaft portion 67a of the opened state locking member 67 is engaged with the engageable recess 6a of the turning bracket 6. The opened state locking member 67 is displaceable between an upper position and a lower position. Further, the engagement release member 56 is displaceable between a lowermost position, an intermediate position and an uppermost position along the push rod 10b. In the state as shown in FIG. 28, the opened state locking member 67 is in the lower position and the engagement release member 56 is in the lower most position. FIGS. 33 and 34 correspond to FIG. 28. In the state as shown in FIG. 33, the opened state locking member 67 is in the upper position and the engagement release member 56 is in the intermediate position. In the state as shown in FIG. 34, the opened state locking member 67 is in the upper position and the engagement release member 56 is in the uppermost position.

FIGS. 4 to 6 show the structure of the portion provided on the left side of the baby carriage while FIGS.

16 to 34 show the structure of the portion provided on the right side of the baby carriage. However, it must be understood that the portions provided on the left and right sides of the baby carriage are basically absolutely identical in structure to each other.

Description is now made on entire operation of the baby carriage according to the present invention.

It is assumed here that the pair of push rods 10a and 10b are fixed in the face-to-back push mode and the baby carriage is locked in the opened state, as shown in FIG. 1. In this case, the operating button 29 provided in the central portion of the push rod connecting member 11 is in the first position as shown in FIG. 8. Further, the rotatable hook 15 mounted on the central portion of the push rod 10b is in an engaged state as shown in FIG. 16. The engagement release member 56 is in the lowermost position as shown in FIGS. 16 and 28. The opened state locking member 67 is in the lower position as shown in FIG. 28.

Assuming that the operating button 29 is manually moved to the second position as shown in FIG. 14, the pair of rotatable members 30 and 31 are oppositely rotated to pull up the wires 42 and 40 along the pair of push rods 10a and 10b. Then, the engagement release member 56 is pulled up by the wire 42, to reach the intermediate position. FIG. 16 shows the second acting portion 61 of the engagement release member 56 thus reaching the intermediate position by the phantom line.

Referring to FIG. 33, the engagement release member 56 is thus moved to the intermediate position, whereby the opened state locking member 67 is pushed up by the push-up portion 64 of the first acting portion 64 to reach the upper position. Consequently, the engageable shaft portion 67a of the opened state locking member 67 is disengaged from the engageable recess 6a of the turning bracket 6, thereby to enable rolling of the turning bracket 6. In other words, the baby carriage is released from the locked opened state, to be in a foldable state.

It is assumed that the thin wall band 45 of the operating button 29 is inwardly pushed by a finger to move the operating button 29 to the third position. Then, the engagement release member 56 is pulled up by the wire 42 to reach the uppermost position as shown in FIG. 23. The second acting portion 61 of the engagement release member 56 upwardly presses the inclined surface 15d of the rotatable hook 15, thereby to bring the rotatable hook 15 into a non-engaged state. In this state, the engageable recess 15a of the rotatable hook 15 is disengaged from the engageable pin 16, whereby the pair of push rods 10a and 10b can be rotated.

Since the opened state locking member 67 and the first acting portion 64 are inhibited from further upward movement as shown in FIG. 34, the engagement release member 56 compresses the spring 65 to reach the uppermost position.

According to the present invention as hereinabove described, the baby carriage is released from the locked opened state by moving the operating button provided in the central portion of the push rod connecting member 11 to the second position. Further, the pair of push rods 10a and 10b are unlocked by moving the operating button 29 to the third position. Thus, the single operating button 29 is adapted to release the baby carriage from the locked opened state as well as to unlock the push rods 10a and 10b, whereby the operation is extremely simplified. Further, the operating button 29 can be driven by one hand, since the same is simply provided in one portion at the center of the push rod connecting member 11.

The baby carriage shown in FIGS. 1 to 34 is only an embodiment of the present invention. Therefore, various modifications are possible within the scope of the present invention. For example, the engageable shaft portion 67a of the opened state locking member 67 is engaged with the engageable recess 6a of the turning bracket 6, thereby to fix the turning bracket 6 in the position along the upper half portion of the rear leg 5 in the embodiment shown in these figures. In place of such a combination of the engageable shaft portion 67a and the engageable recess 6a, a cylindrical tube may be employed to inhibit rotation of the turning bracket, as in the baby carriage disclosed in Japanese Patent Publication Gazette No. 32065/1983 or 13230/1987, for example.

The engagement release member 56 and the first acting portion 4, being separately provided in the aforementioned embodiment, may be integrated with each other. In this case, the opened state locking member 67 will be excessively moved in the upward direction.

Description is now made on some modifications of respective structural parts of the present invention, with reference to the drawings.

FIGS. 35 to 39 illustrate a modification of the part as shown in FIGS. 7 and 8. In these figures, elements identical to those of the aforementioned embodiment art indicated by the same or corresponding reference numerals, and hence redundant description is omitted.

Figure 35:
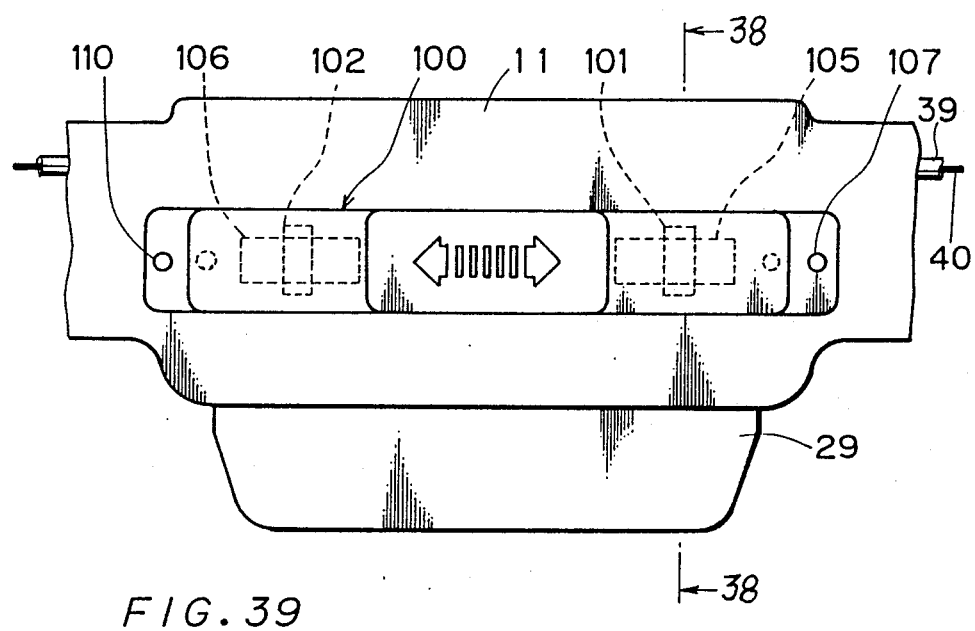
FIG. 35 illustrates another exemplary structure or a portion concerning the operating button 29.

Referring to FIG. 35, a stopper 100 is slidably provided on a push rod connecting member 11. This stopper 100, being centrally positioned in FIG. 35, can be moved in the left and right directions.

Figure 36:
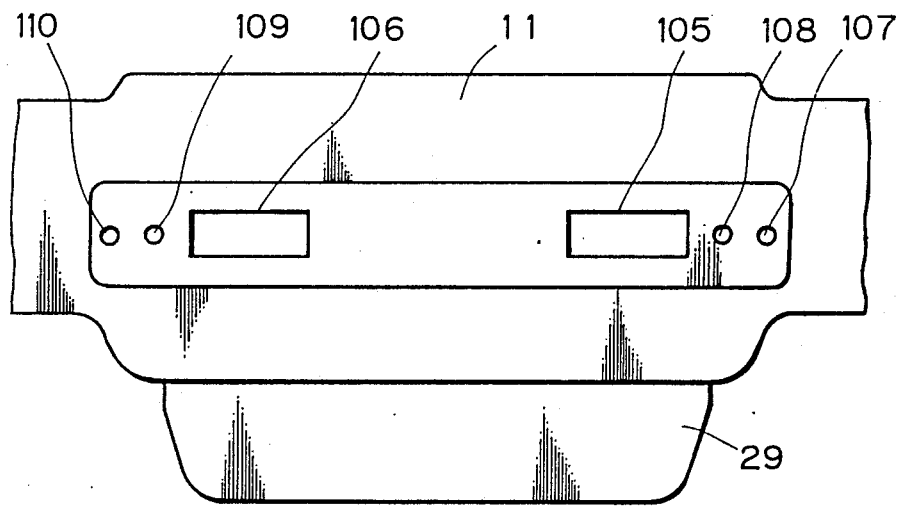
FIG. 36 illustrates such a state that a stopper 100 is removed from the state shown in FIG. 35.
Figure 37:
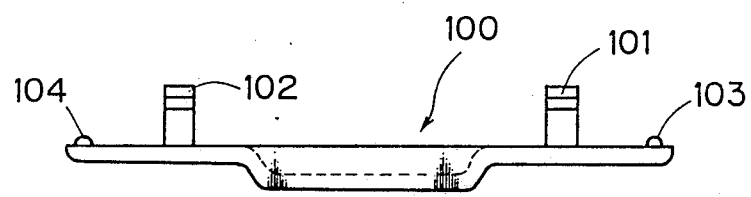
FIG. 37 is a plan view of the stopper 100 shown in FIG. 35.
Figure 38:
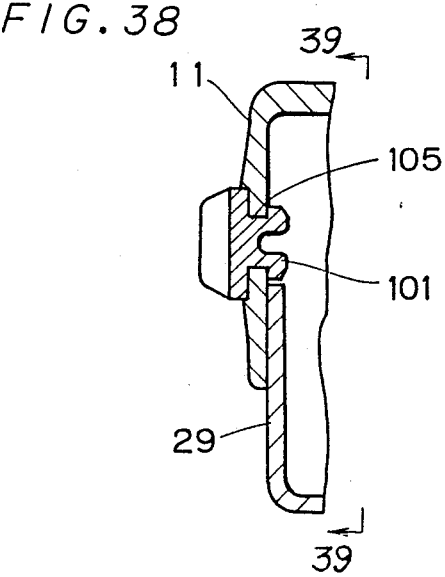
FIG. 38 is a sectional view taken along the line 39—39 in FIG. 35.

FIG. 36 is a view similar to FIG. 35, except that the stopper 100 is removed. FIG. 37 is a plan view showing the stopper 100. FIG. 38 is a sectional view taken along the line 38—38 in FIG. 35.

Referring to FIG. 36, the push rod connecting member 11 is provided with two window portions 105 and 106 passing through its wall and four concave portions 107, 108, 109 and 110. Referring to FIG. 37, the stopper 100 is in the form of a plate as a whole, and provided on its inner side with two claw portions 101 and 102 and two convex portions 103 and 104. As shown in FIG. 38, the first claw portion 101 of the stopper 100 is engaged into the first window portion 105 of the push rod connecting member 11. Similarly, the second claw portion 102 is also engaged into the second window portion 106 of the push rod connecting member 11. When the stopper 100 is centrally positioned as shown in FIG. 35, the convex portion 103 of the stopper 100 is engaged with the concave portion 108 of the push rod connecting member 11, while the other convex portion 104 of the stopper 100 is engaged with the other concave portion 109 of the push rod connecting member 11. Free movement of the stopper 100 is restricted by such engagement. When the stopper 100 is rightwardly moved by a finger from the state shown in FIG. 35, the convex portion 103 of the stopper 100 is engaged into the concave portion 107 of the push rod connecting member 11. When the stopper 100 is leftwardly moved from the state shown in FIG. 35, on the other hand, the convex portion 104 of the stopper 100 is engaged into the concave portion 110 of the push rod connecting member 11.

Figure 39:
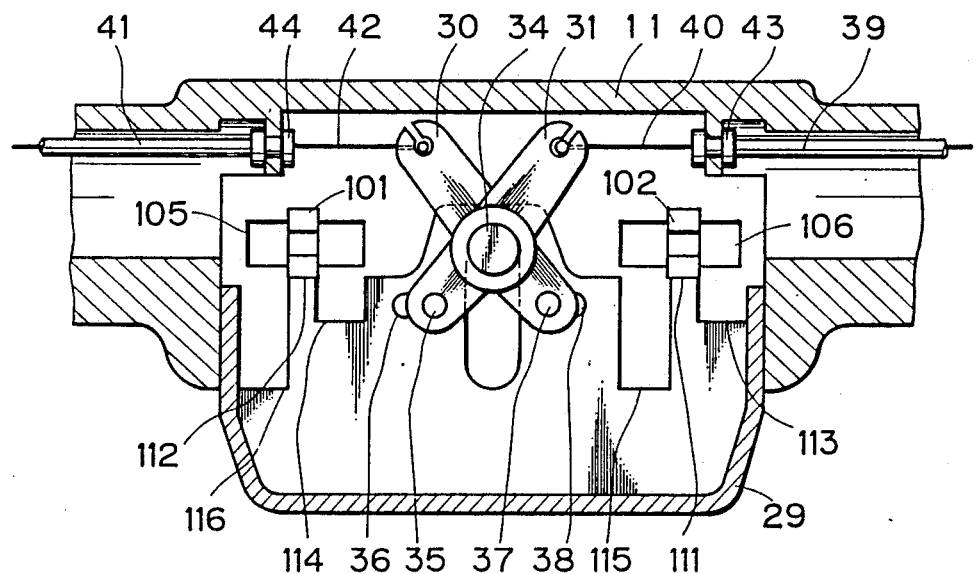
FIG. 39 is a sectional view taken along the line 38—38 in FIG. 38, illustrating internal structure of the portion shown in FIG. 35.

FIG. 39 is a sectional view the internal structure of the part as shown in FIG. 35. This sectional structure is taken along the line 39—39 in FIG. 38. Thus, the two window portions 105 and 106 of the push rod connecting member 11 and the claw portions 101 and 102 of the stopper 100 are observed from FIG. 39. In correspondence to the claw portion 101 of the stopper 100, an operating button 29 is provided with a contact wall portion 112, a first notch portion 114 and a second notch portion 116. The contact wall portion 112 is interposed between the first and second notch portions 114 and 116. The second notch portion 116 is larger in depth than the first notch portion 114. Also in correspondence to the claw portion 102 of the stopper 100, the operating button 29 is provided with a contact wall portion 111, a first notch portion 113 and a second notch portion 115. The contact wall portion 111 is interposed between the first and second notch portions 113 and 115. The second notch portion 115 is larger in depth than the first notch portion 113.

In a normal working condition of the baby carriage, the stopper 100 is in the central position as shown in FIGS. 35 and 39. When the stopper 100 is thus centrally positioned, the contact wall portions 112 and 111 of the operating button 29 are in contact with the claw portions 101 and 102 of the stopper 100 respectively. Thus, the operating button 29 is inhibited from upward movement. Therefore, no upward movement of the operating button 29 is caused by manual misoperation to abruptly release the baby carriage from the locked opened state or to unlock the push rods.

In order to release the baby carriage from the locked opened state, the stopper 100 is leftwardly moved from the position shown in FIG. 35. In other words, the claw portions 101 and 102 are rightwardly moved in FIG. 39. Then, the claw portions 101 and 102 are positioned above the first notch portions 114 and 113 respectively. In this state, the operating button 29 is upwardly moved to be in contact with the claw portions 101 and 102 in the aforementioned second position, thereby to release the baby carriage from the locked opened state.

On the other hand, the claw portions 101 and 102 of the stopper 100 are leftwardly moved in FIG. 39, to be positioned above the second notch portions 116 and 115 of the operating button 29 respectively. In this state, the operating button 29 is upwardly moved to be in contact with the claw portions 101 and 102 in the aforementioned third position, thereby to unlock the push rods.

Figure 40:
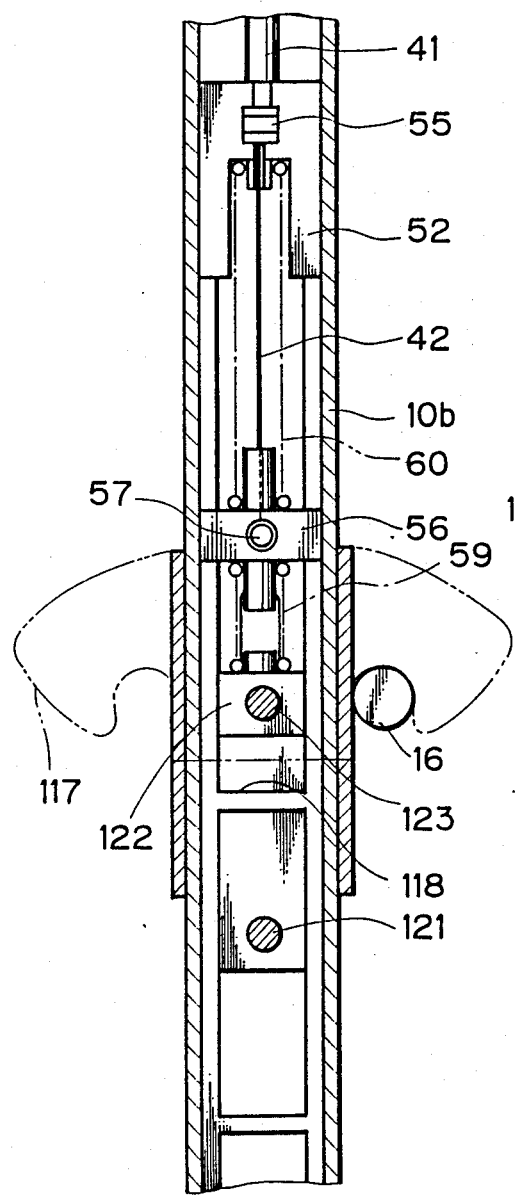
FIG. 40 is a sectional view showing another exemplary structure concerning the push rod locking member.

FIGS. 40 to 46 are adapted to illustrate a modification of a structural part concerning the push rod locking member shown in FIG. 16. FIG. 40 corresponds to FIG. 16. Also in these figures, elements identical to those in the aforementioned embodiment are indicated by the same or corresponding reference numerals.

Figure 41:
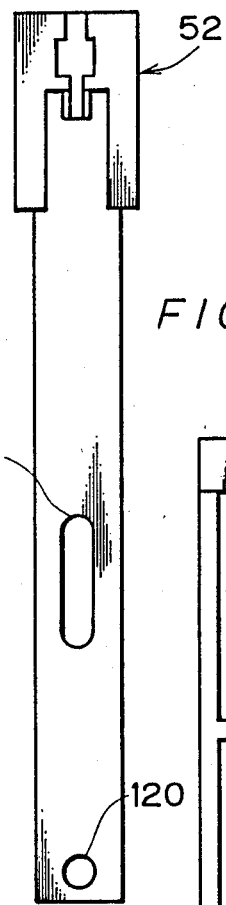
FIG. 41 is a front elevational view of a fixing member 52 shown in FIG. 40.

In the aforementioned embodiment, the rotatable hook 15 is employed as the push rod locking member. In the modification as shown in FIG. 40, however, the push rod locking member is implemented by a sliding hook 117, which is vertically slidable along a push rod 10b. FIG. 41, corresponding to FIG. 17, illustrates a fixing member 52. The fixing member 52 shown in FIG. 41 is provided with a vertically elongated hole 119 and a round hole 120. The fixing member 52 is fixed to the push rod 10b through a shaft 121 passing through the round hole 120.

Figure 42:
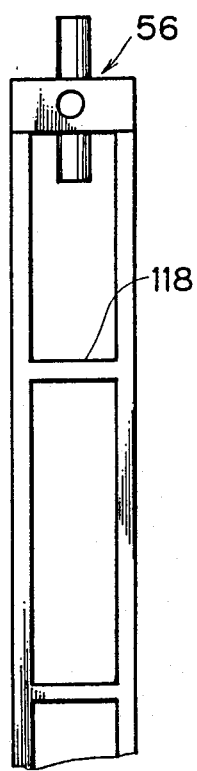
FIG. 42 is a front elevational view of the engagement release member 56 shown in FIG. 40.

FIG. 42, corresponding to FIG. 19, illustrates an engagement release member 56. In the engagement release member 56 shown in FIG. 42, a rib 118 serves as the aforementioned second acting portion (61).

Figure 44:
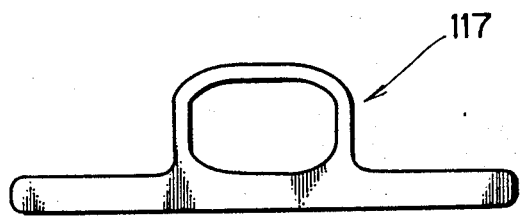
FIG. 44 is a plan view of the sliding hook.
Figure 43:
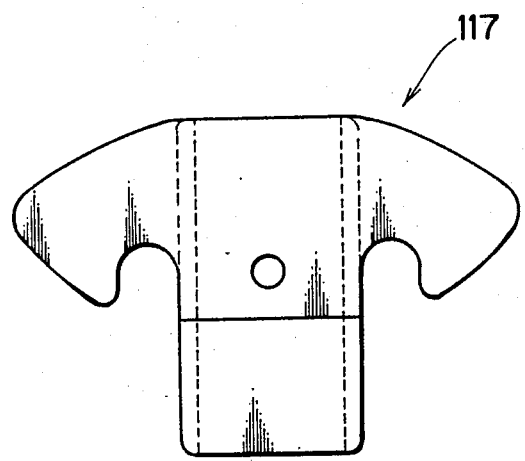
FIG. 43 is a front elevational view of a sliding hook shown in FIG. 40.

FIG. 43 is a front elevational view showing the sliding hook 117, and FIG. 44 is a plan view thereof. As shown in these figures, the sliding hook 117 is in the form of a sleeve which can enclose the push rod 10b.

The push rod 10b is provided with an elongated hole which is identical in size to the elongated hole 119 in a position aligned with the elongated hole 119 of the fixing member 52 shown in FIG. 41.

Referring to FIG. 40, a spring support member 122 is provided in the push rod 10b. The spring support member 122 and the sliding hook 117 are fixed to each other through a shaft 123 passing through the elongated hole 119 of the fixing member 52 and that of the push rod 10b. Thus, the sliding hook 117 and the spring support member 122 are vertically movable within the range of movement of the shaft 123 in the elongated hole 119 of the fixing member 52 and that of the push rod 10b. In the state of FIG. 40, the shaft 123 is positioned at lower ends of the elongated hole 119 of the fixing member 52 and that of the push rod 10b. As shown in FIG. 40, a spring 59 is provided between the engagement release member 56 and the spring support member 122. This spring 59 regularly downwardly urges the spring support member 122. When the sliding hook 117 is in a lower position as shown in FIG. 40, the sliding hook 117 is engaged with an engageable pin 16 to fix the push rod 10b in position.

Figure 45:
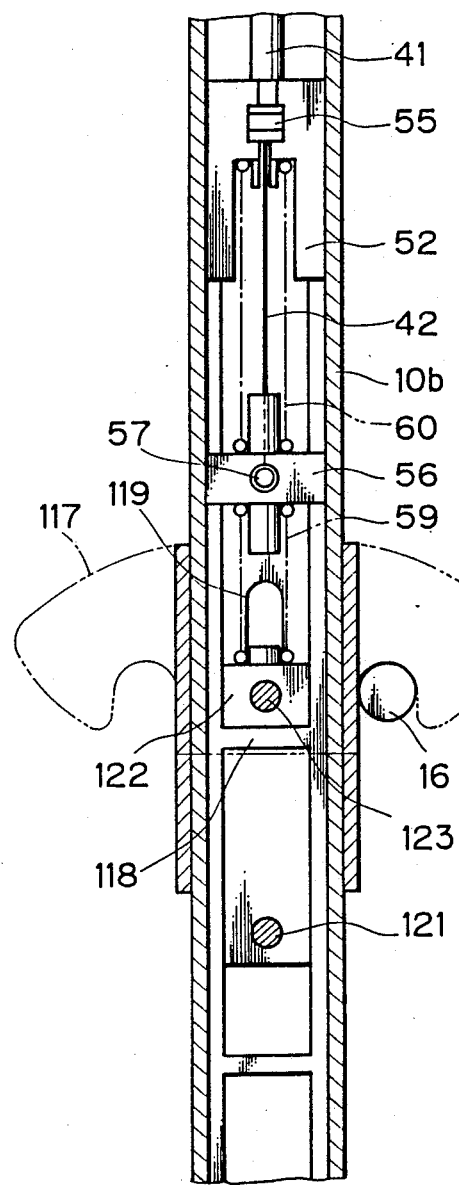
FIG. 45 is a front elevational view corresponding to FIG. 40, showing such a state that the engagement release member 56 is brought into an intermediate position.

FIG. 45 shows such a state that the engagement release member 56 is pulled up by a wire 42 toward an intermediate position. In the state as shown in FIG. 45, the sliding hook 117 is not upwardly moved.

Figure 46:
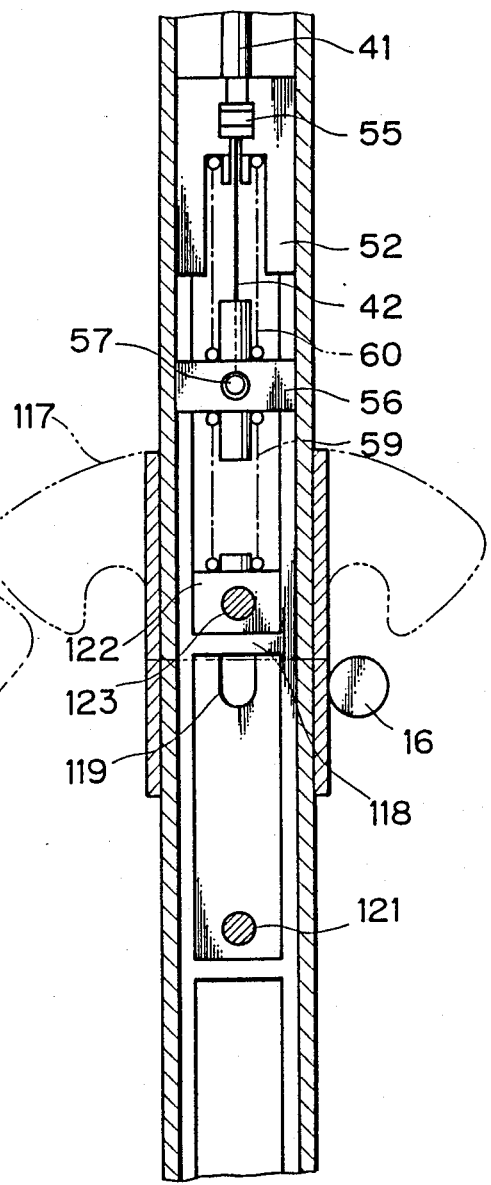
FIG. 46 is a front elevational view corresponding to FIG. 40, showing such a state that the engagement release member 56 is brought into an uppermost position.

In FIG. 46 corresponding to FIG. 23, the engageable release member 56 is further pulled up by the wire 42 toward an uppermost position. In the state as shown in FIG. 46, the rib 118 of the engagement release member 56 pushes up the spring support member 122. Since the spring support member 122 and the sliding hook 117 are fixed to each other through the shaft 123, the sliding hook 117 is upwardly moved following upward movement of the spring support member 122, to be disengaged from the engageable pin 16.

Figure 47:
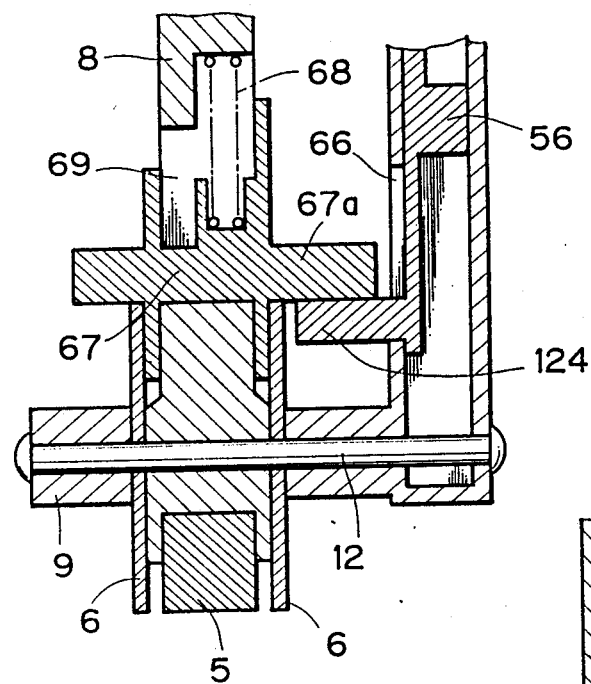
FIG. 47 is a sectional view corresponding to FIG. 28, showing another exemplary structure concerning the first acting member.

FIG. 47, corresponding to FIG. 28, illustrates a modification of the first acting portion 64 of the engagement release member 56. The first acting portion 64 of the structure shown in FIG. 28 is provided independently of the engagement release member 56. In the structure as shown in FIG. 47, however, an engagement release member 56 is integrally provided with a first acting portion 124.

Figure 48:
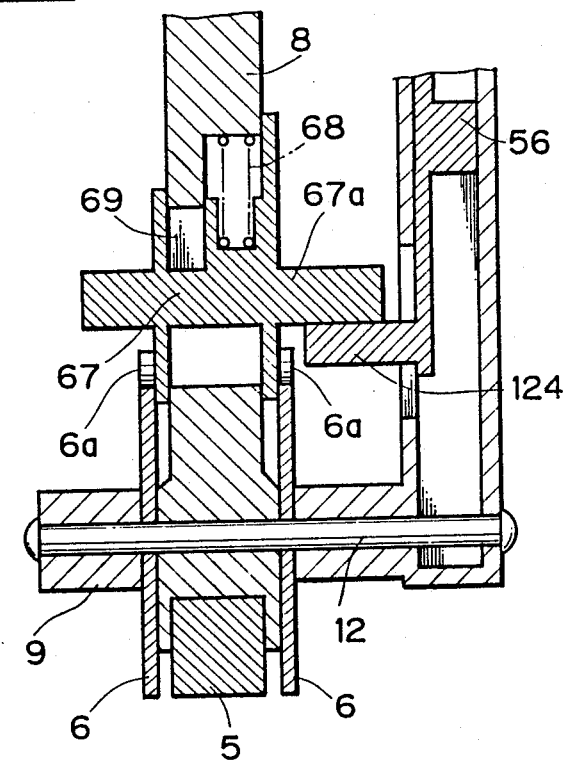
FIG. 48 illustrates such a state that the engagement release member is brought into an intermediate position from the state shown in FIG. 47.

FIG. 48, corresponding to FIG. 33, illustrates such a state that the engagement release member 56 is brought into an intermediate position. In the state as shown in FIG. 48, an engageable shaft portion 67a of an opened state locking member 67 is disengaged from an engageable recess 6a of a turning bracket 6. Since further upward movement is allowable for the opened state locking member 67 being in the state shown in FIG. 48, the engagement release member 56 can be further upwardly moved to reach an uppermost position.

There is a baby carriage which is dimensionally reduced in the cross direction in addition to the longitudinal direction when the same is shifted from an opened state into a folded state. A modification shown in FIGS. 49 to 53 is directed to such a baby carriage.

A push rod connecting member 11 connecting a pair of push rods 10a and 10b can be bent substantially in its central portion, so that the baby carriage can be reduced in size in the cross direction upon folding. FIGS.

49 and 50 are plan sectional views illustrating such a push rod connecting member 11, which is formed by three members of a central member 125, a right side member 126 and a left side member 127. The right side member 126 has a first end rotatably connected to the central member 125 through a shaft 128 and a second end rotatably connected to one of the push rods 10a and 10b. The left side member 127 has a first end rotatably connected to the central member 125 through a shaft 129 and a second end rotatably connected to the other one of the push rods 10a and 10b.

Figure 49:
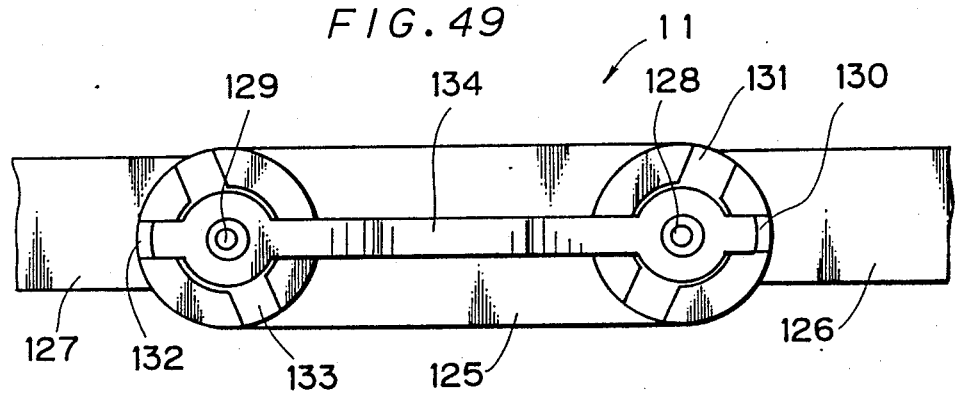
FIG. 49 is a plan view illustrating a push rod connecting member which can be bent at its central portion.
Figure 50:
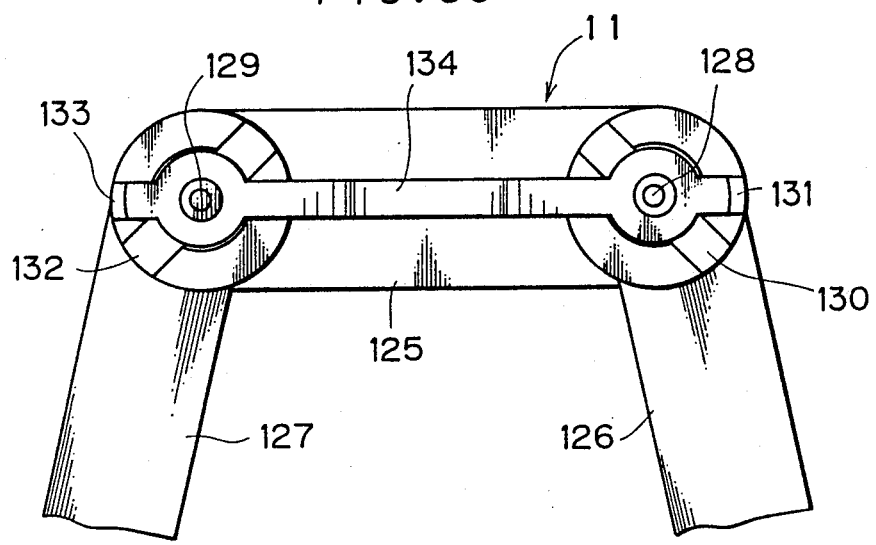
FIG. 50 illustrates a state of the push rod connecting member being bent from the state shown in FIG. 49.

FIG. 49 corresponds to an opened state of the baby carriage, in which the left side member 127, the central member 125 and the right side member 126 are substantially linearly aligned with each other. FIG. 50 corresponds to a folded state of the baby carriage, in which the left side member 127 is bent with respect to the central member 125, while the right side member 126 is also bent with respect to the central member 125.

Referring to FIGS. 49 and 50, linearly extending first and second groove portions 130 and 131 are provided on the right side member 126. Similarly, linearly extending first and second groove portions 132 and 133 are provided on the left side member 127. A locking plate 137 is so provided on the central member 125 that both end portions thereof can be fitted into said groove portions. The locking plate 134 is fitted into the first groove portions 130 and 132 of the right and left side members 126 and 127 to inhibit the same from rotation with respect to the central member 125. Namely, the linearly aligned state as shown in FIG. 49 is thus fixed/maintained.

The locking plate 134 is also fitted into the second groove portions 131 and 133 of the right and left side members 126 and 127 to inhibit the same from rotation with respect to the central member 125. Namely, the bent state as shown in FIG. 50 is thus fixed/maintained.

In order to shift the baby carriage from an opened state into a folded state and vice versa, the locking plate 134 must be disengaged from the groove portions. The structure for such operation is clarified from FIGS. 51 to 53.

Figure 51:
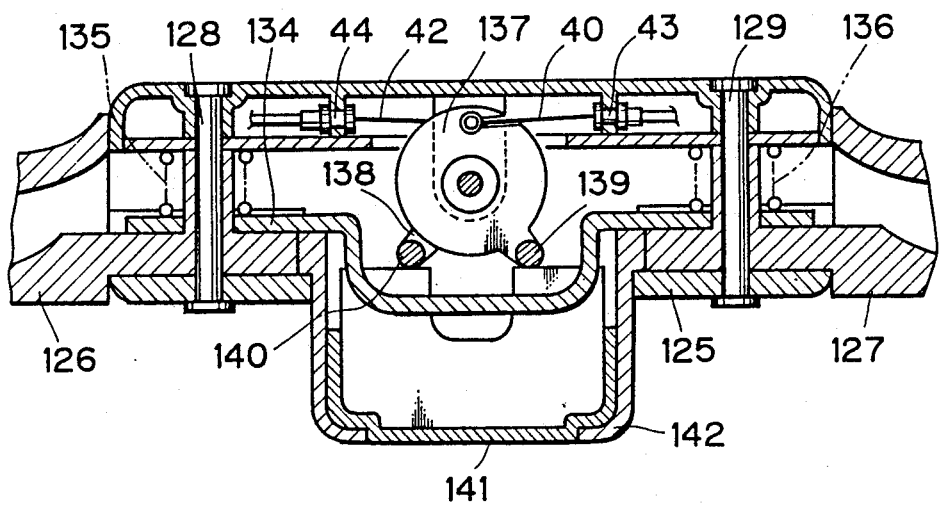
FIG. 51 is a sectional view of the central portion of the push rod connecting member shown in FIG. 49.
Figure 52:
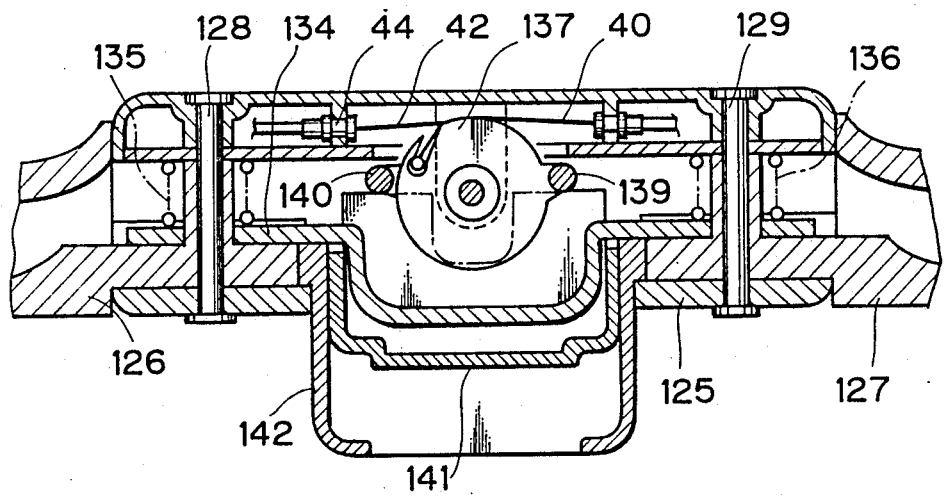
FIG. 52 is a sectional view illustrating such a state that a first operating button 141 is upwardly moved from the state shown in FIG. 51.
Figure 53:
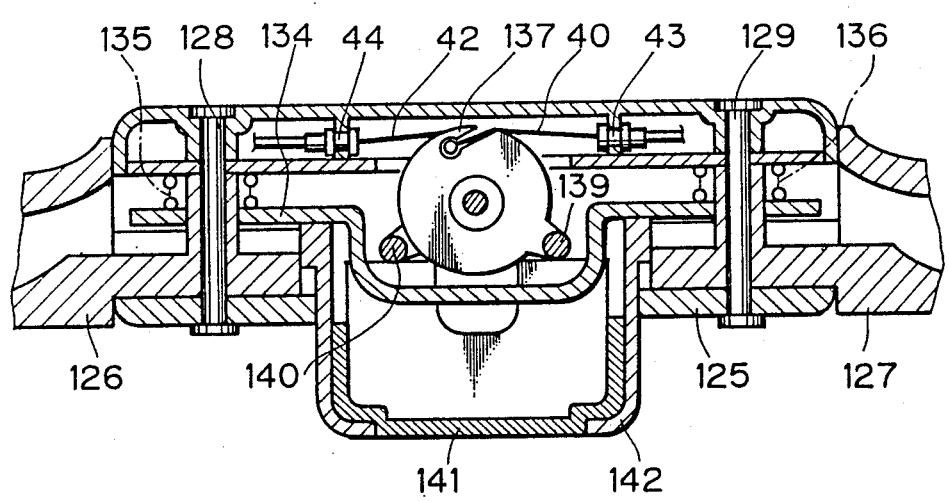
FIG. 53 is a sectional view illustrating such a state that the first operating button 141 and a second operating button 142 are upwardly moved from the state shown in FIG. 51.

FIG. 51 corresponds to FIG. 8. The locking plate 134 is regularly downwardly urged by springs 135 and 136. In other words, the locking plate 134 is urged by the springs 135 and 136 to be regularly fitted into the groove portions 130 and 131 of the right side member 126 and the groove portions 132 and 133 of the left side member 127. The modifications as shown in FIGS. 51 to 53 employs disc-shaped rotatable members 137 and 138. The rotatable members 137 and 138 are provided with shafts 139 and 140 respectively. The disc-shaped rotatable members 137 and 138 are so advantageously employed that wires 40 and 42 extend along arcuate outer surfaces of the rotatable members 137 and 138 upon rotation of the rotatable members 137 and 138, whereby the wires 40 and 42 are largely displaced as compared with those shown in FIG. 8.

In the structure shown in FIGS. 51 to 53, further, employed are two operating buttons, i.e., first and second operating buttons 141 and 142. The second operating button 142 can be upwardly moved from the state shown in FIG. 51. Further, the upper end portion of the second operating button 142 is adapted to be in contact with the lower surface of the locking plate 134. The first operating button 141 is positioned inside the second operating button 142, and upwardly movable from the state shown in FIG. 51. The upper end portion of the first operating button 141 is in contact with the shafts 139 and 140 of the rotatable members 137 and 138. Therefore, when the first operating button 141 is upwardly moved from the state shown in FIG. 51, the rotatable member 137 is rotated counterclockwise in the figures while the other rotatable member 138 is rotated clockwisely in the figures.

Description is now made on operation of the structure shown in FIGS. 49 to 53.

In order to unlock the push rods of the baby carriage, only the first operating button 141 is manually upwardly moved as shown in FIG. 52. The position of the second operating button 142 is not changed. With such upward movement of the first operating button 141, the rotatable members 137 and 138 are rotated in prescribed directions, to bring the engagement release member to the uppermost position.

In order to release the baby carriage from a locked opened state, on the other hand, the first and second operating button 141 and 142 are simultaneously moved as shown in FIG. 53, With upward movement of the second operating button 142, the locking plate 134 is also upwardly moved to be disengaged from the first groove portions 130 and 132 of the right and left side members 126 and 127. The rotatable members 137 and 138 being rotated by prescribed amounts through the first operating button 141 bring the engagement release member to an intermediate position. In this state, the baby carriage is released from the locked opened state. The baby carriage is thus shifted into a folded state, while the push rod connecting member 11 is bent in its central portion as shown in FIG. 50, to be reduced in width. When the baby carriage is finally folded, the first and second operating buttons 141 and 142 are unhanded so that the locking plate 134 returns to its original position by urging force of the springs 135 and 136, to be fitted into the second groove portions 131 and 133 of the right and left side members 126 and 127.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage comprising: a pair of rear legs (5) extending rearward and downward; a pair of turning brackets (6) having first ends rotatably connected to central portions of said rear legs, to be rollable along upper or lower half portions of said rear legs; and a pair of push rods (10a, 10b) having lower end rotatably connected to second ends of said turning brackets, said turning brackets (6) being fixed in positions along said upper half portions of said rear legs (5) in an opened state of said baby carriage thereby to lock the same in said opened state, said turning brackets (6) being positioned along said lower half portions of said rear legs (5) in a closed state of said baby carriage, said baby carriage further comprising: a push rod connecting member (11) extending in the cross-direction of said baby carriage to connect upper end portions of said pair of push rods with each other; a pair of opened state locking members (67) being displaceable between upper and lower positions to be engaged with said turning brackets (6) upon movement to said lower position in said opened state of said baby carriage thereby to fix said turning brackets in positions along said upper half portions of said rear legs; a pair of urge means (68) for regularly urging said opened state locking members toward said lower position; wire means (40, 42) extending along said pair of push rods and said push rod connecting member to connect said pair of opened state locking members with each other; and operating means (29, 30, 31) being displaceable between first and second positions and connected to said wire means at the central portion of said push rod connecting member, said operating means (29, 30, 31) being in said first position upon location of said pair of opened state locking members (67) in said lower position, said pair of opened state locking members being pulled up by said wire means toward said upper position upon manual movement of said operating means into said second position, said baby carriage further comprising: a stopper (100) displaceably provided on said push rod connecting member (11) to be engaged with said operating means when said operating means is in said first position thereby to inhibit movement of said operating means.

2. A baby carriage in accordance with claim 1, wherein said operating means includes: an operating button (29) vertically movably integrated into said central portion of said push rod connecting member, and a pair of rotatable members (30, 31) having central portions rotatably mounted on said central portions of said push rod connecting member through shafts and first ends being in contact with said operating button, said pair of rotatable members (30, 31) are rotated oppositely to each other following vertical movement of said operating button, and said wire means (40, 42) extending from said pair of opened state locking members (67) is separated at the central portion of said push rod connecting member such that one of separated ends is connected to a second end of one of said pair of rotatable members and the other said separated end is connected to a second end of the other said rotatable member.

3. A baby carriage comprising: a pair of vertically extending push rods (10a, 10b) having lower end portions rotatably connected to the body of said baby carriage to be switchable between face-to-back and face-to-face push modes; a push rod connecting member (11) extending in the cross-direction of said baby carriage to connect upper end portions of said pair of push rods with each other; a pair of push rod locking members (15, 117) mounted on central portions of said push rods to be displaceable between engaged and non-engaged positions; engageable means (16, 17) provided on the body of said baby carriage to be engaged with said push rod locking members being in said engaged portions thereby to fix said push rods in said face-to-back or face-to-face push mode; a pair of urge means (59) for regularly urging said push rod locking members (15, 117) toward said engaged position; wire means (40, 42) extending along said pair of push rods and push rod connecting member to connect said pair of push rod locking members with each other; and operating means (29, 30, 31) being displaceable between first and second positions and connected to said wire means at the central portion of said push rod connecting member, said operating means being in said first position upon location of said pair of push rod locking members in said engaged position, said pair of push rod locking members being pulled up by said wire means toward non-engaged position upon manual movement of said operating means into said second position, said baby carriage further comprising: a stopper (105) displaceably provided on said push rod connecting member to be engaged with said operating means when said operating means is in said first position thereby to inhibit movement of said operating means.

4. A baby carriage in accordance with claim 3, wherein said operating means includes: an operating button (29) vertically movably integrated into said central portion of said push rod connecting member, and a pair of rotatable members (30, 31) having central portions rotatably mounted on said central portion of said push rod connecting member through shafts and first ends being in contact with said operating button, said pair or rotatable members are rotated oppositely to each other following vertical movement of said operating button, and said wire means extending from said pair of push rod locking members is separated at the central portion of said push rod connecting member such that one of separated ends is connected to a second end of one of said pair of rotatable members and the other said separated end is connected to a second end of the other said rotatable member.

5. A baby carriage comprising: rear legs (5) extending rearward and downward; turning brackets (6) having first ends rotatably connected to central portions of said rear legs, to be rollable along upper or lower half portions of said rear legs; and push rods (10a, 10b) having lower ends rotatably connected to second ends of said turning brackets, said turning brackets being fixed in positions along said upper half portions of said rear legs in an opened state of said baby carriage thereby to lock the same in said opened state, said turning brackets being positioned along said lower half portions of said rear legs in a closed state of said baby carriage, said baby carriage further comprising: opened state locking members (67) being displaceable between upper and lower portions to be engaged with said turning brackets upon movement to said lower position in said opened state of said baby carriage thereby to fix said turning brackets in positions along said upper half portions of said rear legs; urge means (68) for regularly urging said opened state locking members toward said lower position; wire means (40, 42) extending along said push rods and connected to said opened state locking members, and operating means (29, 30, 31) being displaceable between first and second positions and connected to said wire means at the upper portions of said push rods, said operating means being in said first position upon location of said opened state locking members in said lower position, said opened state locking members being pulled up by said wire means toward said upper position upon manual movement of said operating means into said second position, said baby carriage further comprising: stopper means (100) displaceably provided on said push rods to be engaged with said operating means when said operating means is in said first position thereby to inhibit movement of said operating means.

* * * * *